US009742765B2

(12) United States Patent
Toyonaga et al.

(10) Patent No.: US 9,742,765 B2
(45) Date of Patent: Aug. 22, 2017

(54) AUTHENTICATION SYSTEM AND AUTHENTICATION METHOD

(71) Applicant: PANASONIC INTELLECTUAL PROPERTY MANAGEMENT CO., LTD., Osaka (JP)

(72) Inventors: Saburo Toyonaga, Fukuoka (JP); Hiroyuki Tanaka, Fukuoka (JP); Masakatsu Matsuo, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/591,390

(22) Filed: Jan. 7, 2015

(65) Prior Publication Data
US 2015/0195280 A1    Jul. 9, 2015

(30) Foreign Application Priority Data

Jan. 8, 2014  (JP) ................................ 2014-001997

(51) Int. Cl.
*H04L 29/06* (2006.01)

(52) U.S. Cl.
CPC ...... *H04L 63/0876* (2013.01); *H04L 63/0428* (2013.01); *H04L 63/0435* (2013.01); *H04L 63/123* (2013.01); *H04L 2209/56* (2013.01)

(58) Field of Classification Search
CPC ................ H04L 63/0428; H04L 2209/56
See application file for complete search history.

(56) References Cited

U.S. PATENT DOCUMENTS

| 5,671,279 | A  | * | 9/1997 | Elgamal | ................. | G06Q 20/02 |
|           |    |   |        |         |                    | 380/29 |
| 7,177,424 | B1 | * | 2/2007 | Furuya  | .................. | H04L 9/0618 |
|           |    |   |        |         |                    | 380/259 |

(Continued)

FOREIGN PATENT DOCUMENTS

| EP | 2398206 A1 | 12/2011 |
| JP | 2007-249726 A | 9/2007 |

(Continued)

OTHER PUBLICATIONS

Tiwari, A., Sanyal, S., Abraham, A., Knapskog, S. J., & Sanyal, S. (2011). A multi-factor security protocol for wireless payment-secure web authentication using mobile devices. arXiv preprint arXiv:1111.3010.*

(Continued)

*Primary Examiner* — James Turchen
(74) *Attorney, Agent, or Firm* — Greenblum & Bernstein, P.L.C.

(57) ABSTRACT

Provided is an authentication system in which a client terminal that receives input of request information is connected to a server that executes a process with regard to the request information. The client terminal includes: a first authentication information generation unit that generates first authentication information based on information which is shared with the server; an encryption unit that generates encryption information; and a transmission unit that transmits the request information and encryption information to the server. The server includes: a reception unit that receives the request information and encryption information; a second authentication information generation unit that generates second authentication information; a decoding unit that generates reference information which is acquired by decoding the encryption information using the same common key method as in the client terminal while using the second (Continued)

authentication information as a key; and an authentication unit that compares the request information with the reference information.

7 Claims, 10 Drawing Sheets

(56) References Cited

U.S. PATENT DOCUMENTS

| | | | |
|---|---|---|---|
| 8,719,902 B2 | 5/2014 | Yamada et al. | |
| 9,178,855 B1* | 11/2015 | Yung | H04L 9/0866 |
| 2001/0051996 A1* | 12/2001 | Cooper | G06Q 10/10 |
| | | | 709/217 |
| 2004/0151323 A1* | 8/2004 | Olkin | G06Q 20/401 |
| | | | 380/280 |
| 2005/0204142 A1 | 9/2005 | Axelsson | |
| 2007/0220597 A1 | 9/2007 | Ishida | |
| 2007/0276900 A1* | 11/2007 | Wang | G06Q 10/06 |
| | | | 709/203 |
| 2008/0046988 A1* | 2/2008 | Baharis | H04L 9/3271 |
| | | | 726/7 |
| 2008/0187134 A1* | 8/2008 | Nourry | H04L 9/12 |
| | | | 380/29 |
| 2009/0300352 A1 | 12/2009 | Schneider | |
| 2011/0145517 A1* | 6/2011 | Bish | G06F 3/0605 |
| | | | 711/154 |
| 2011/0145581 A1* | 6/2011 | Malhotra | H04L 63/126 |
| | | | 713/171 |
| 2011/0302412 A1* | 12/2011 | Deng | H04L 63/0407 |
| | | | 713/159 |
| 2011/0314293 A1 | 12/2011 | Yu | |
| 2012/0144203 A1* | 6/2012 | Albisu | G06F 21/35 |
| | | | 713/184 |
| 2012/0162537 A1* | 6/2012 | Maddali | H04N 21/4126 |
| | | | 348/734 |
| 2013/0230173 A1* | 9/2013 | Hori | G08G 1/092 |
| | | | 380/281 |
| 2014/0164777 A1* | 6/2014 | Wielopolski | H04L 9/0866 |
| | | | 713/171 |
| 2014/0245425 A1* | 8/2014 | Potlapally | H04L 63/164 |
| | | | 726/14 |
| 2014/0359782 A1* | 12/2014 | Golic | G06F 21/6254 |
| | | | 726/26 |
| 2015/0032633 A1* | 1/2015 | Haider | G06F 19/322 |
| | | | 705/51 |

FOREIGN PATENT DOCUMENTS

| | | |
|---|---|---|
| JP | 4693171 B2 | 6/2011 |
| WO | 03/088566 A1 | 10/2003 |

OTHER PUBLICATIONS

Hashemi, M. R., & Soroush, E. (May 2006). A secure m-payment protocol for mobile devices. In Electrical and Computer Engineering, 2006. CCECE'06. Canadian Conference on (pp. 294-297). IEEE.*

Ceipidor, U. B., Medaglia, C. M., Marino, A., Sposato, S., & Moroni, A. (Sep. 2012). Kernees: a protocol for mutual authentication between nfc phones and pos terminals for secure payment transactions. In Information Security and Cryptology (ISCISC), 2012 9th International ISC Conference on (pp. 115-120). IEEE.*

Dodson, B., Sengupta, D., Boneh, D., & Lam, M. S. (2010). Secure, consumer-friendly web authentication and payments with a phone. In Mobile Computing, Applications, and Services (pp. 17-38). Springer Berlin Heidelberg.*

Herzberg, A. (2003). Payments and banking with mobile personal devices.Communications of the ACM, 46(5), 53-58.*

International Search Report and Written Opinion mailed Mar. 23, 2015 for International Application No. PCT/JP2014/006370.

* cited by examiner

FIG. 2A

BRS

Transaction information
User ID:
Transaction amount:
Payment destination:
Transaction date and time:

FIG. 2B

CKS1

Transaction information
User ID:
Transaction amount:
Payment destination:
Transaction date and time:

CKS2

Transaction information
User ID:
Transaction amount:
Payment destination:
Transaction date and time:
Check code: 4 8 0 5 6
Check code:
Input field: [    ] CF   [ OK ] — B2

FIG. 2D

CKS3

Transaction information
User ID:
Transaction amount:
Payment destination:
Transaction date and time:
Password: [    ] — PF

| 1 | C | 4 | 9 |
|---|---|---|---|
| 8 | F | D | 6 |
| A | 5 | 0 | 2 |
| E | 3 | 7 | B |

MT

[ OK ] — B3

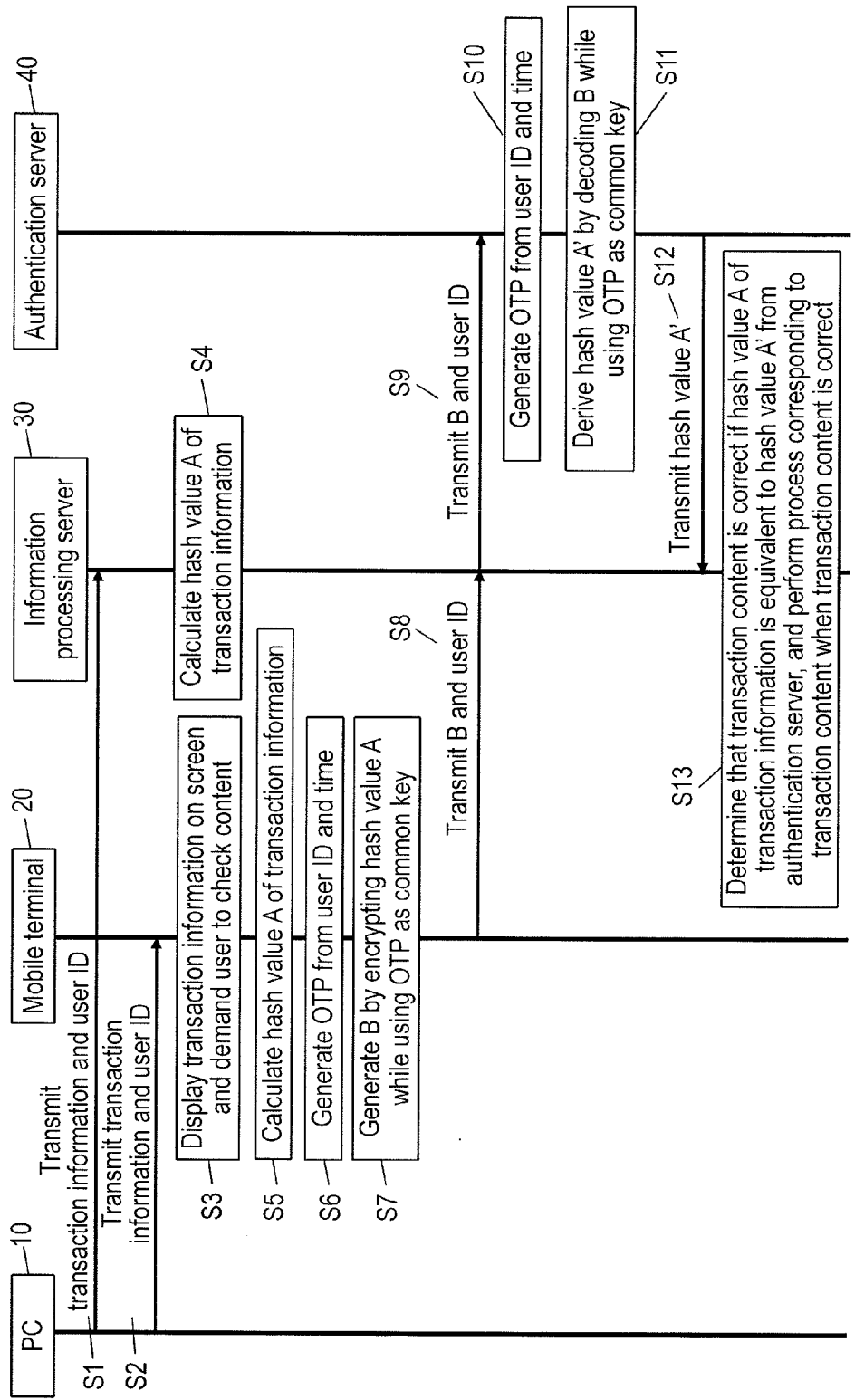

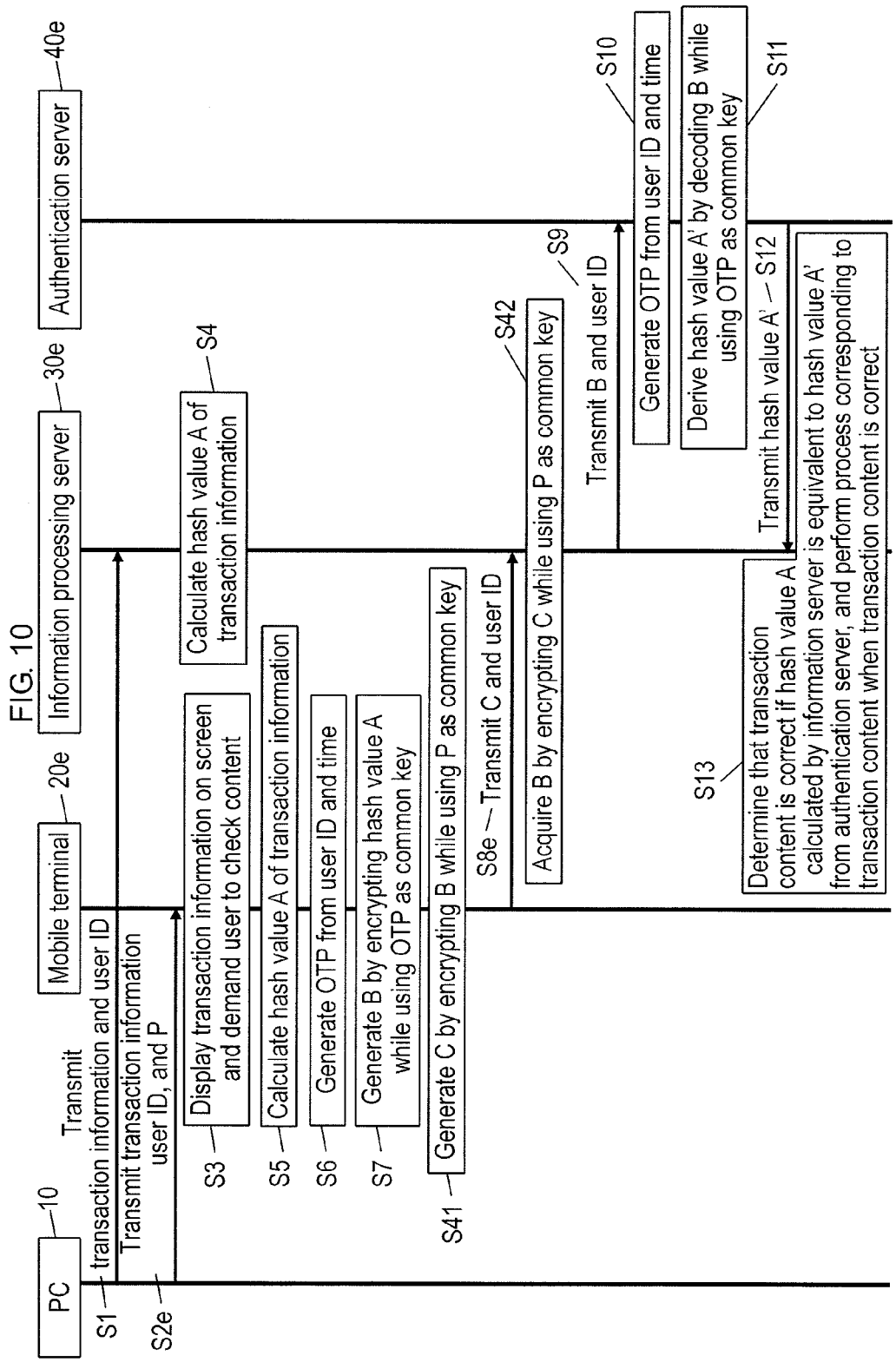

AUTHENTICATION SYSTEM AND AUTHENTICATION METHOD

BACKGROUND OF THE INVENTION

1. Field of the Invention

The present invention relates to an authentication system and an authentication method between a client terminal and a server which are connected through a network.

2. Description of the Related Art

In the related art, as disclosed in PTL 1 (Japanese Patent No. 4693171), when a server which provides an on-line service (for example, on-line banking) provides various services to one or more client terminals which are connected through a network (for example, the Internet), the server authenticates whether or not a terminal which requests the provision of a service is a client terminal which is approved in advance.

An authentication system disclosed in PTL 1 includes an on-line service server which provides an on-line service, an information terminal apparatus which receives the provision of the on-line service, a one-time password server which executes processes related to login authentication of the information terminal apparatus in the on-line service server and transaction content authentication in the on-line service, and a mobile terminal apparatus which is carried by a user who receives the on-line service of the information terminal apparatus and which displays a one-time password used for the login authentication and the transaction content authentication.

In the authentication system, the mobile terminal apparatus respectively transmits acquisition requests for a one-time password for the login authentication and a one-time password for the transaction content authentication, which are necessary when the information terminal apparatus receives an on-line service from the on-line service server, to the one-time password server, and then the mobile terminal apparatus respectively receives the one-time password for the login authentication and the one-time password for the transaction content authentication from the one-time password server, and displays the one-time password for the login authentication and the one-time password for the transaction content authentication.

The information terminal apparatus transmits a login authentication screen acquisition request to the on-line service server, and receives and displays a login authentication screen, including a challenge generated in the one-time password server, according to an instruction transmitted from the on-line service server to the one-time password server. The information terminal apparatus transmits the received challenge to the mobile terminal apparatus, and receives the one-time password for the login authentication, which is generated using the challenge, from the mobile terminal apparatus.

In addition, the information terminal apparatus transmits a transaction authentication screen acquisition request including the transaction content to the on-line service server, and receives and displays the transaction authentication screen, to which transaction preparation information, in which a set of the one-time password for the transaction content authentication, generated by the one-time password server, and the transaction content is encrypted using a common key shared by the one-time password server and the mobile terminal apparatus, and the transaction content are added, according to the instruction transmitted from the on-line service server to the one-time password server.

Further, the information terminal apparatus transmits the transaction preparation information to the mobile terminal apparatus, and receives the one-time password for the transaction content authentication, which is acquired by causing the mobile terminal apparatus to decode the transaction preparation information using the common key which is shared between the mobile terminal apparatus and the one-time password server, from the mobile terminal apparatus. Therefore, the authentication system disclosed in PTL 1 discriminately generates the one-time password for the login authentication and the one-time password for the transaction content authentication respectively. Therefore, as long as the one-time password for the transaction content authentication does not leak out even when the one-time password for the login authentication leaks out by, for example, spyware, it is possible to avoid the falsification of the transaction content even if a malicious third party illegally uses the one-time password for the login authentication.

SUMMARY OF THE INVENTION

However, in PTL 1, the one-time password for the transaction content authentication is exchanged between the one-time password server and the mobile terminal apparatus, with the result that, if, for example, man-in-the-middle attacks by a malicious third party occur, the one-time password for the transaction content authentication leaks out, and thus it is difficult for a user to detect the falsification of the content of requested transaction information (for example, payment destination or payment amount).

For example, even when the user checks that the requested transaction information is not falsified by checking the display of the mobile terminal apparatus, there is a problem in that it is difficult to detect falsification when display content itself is falsified.

In order to solve the above-described problem in the related art, an object of embodiments which will be described below is to provide an authentication system and an authentication method, which detect the falsification of request information and safely authenticate request information from a client terminal which accesses a server.

According to an embodiment which will be described below, there is provided an authentication system in which a client terminal that receives input of request information is connected to a server that executes a process with regard to the request information, the client terminal includes: a first authentication information generation unit that generates first authentication information based on information which is shared with the server; an encryption unit that generates encryption information which is acquired by encrypting the request information using a common key method while using the first authentication information as a key; and a transmission unit that transmits the request information and the encryption information to the server, and the server includes: a reception unit that receives the request information and the encryption information; a second authentication information generation unit that generates second authentication information based on the information which is shared with the client terminal; a decoding unit that generates reference information which is acquired by decoding the encryption information using the same common key method as in the client terminal while using the second authentication information as a key; and an authentication unit that compares the request information with the reference information.

According to the authentication system, it is possible to detect the falsification of the request information and to safely authenticate the request information from the client terminal which accesses the server.

According to another embodiment which will be described blow, there is provided an authentication method which is executed by a client terminal that receives input of request information and a server that executes a process with regard to the request information, the authentication method including: causing the client terminal to generate first authentication information based on information which is shared with the server, generate encryption information which is acquired by encrypting the request information using a common key method while using the first authentication information as a key, and transmit the request information and the encryption information to the server; and causing the server to receive the request information and the encryption information, generate second authentication information based on the information which is shared with the client terminal, generate reference information which is acquired by decoding the encryption information using the same common key method as in the client terminal while using the second authentication information as a key, and compare the request information with the reference information.

According to the authentication method, it is possible to detect the falsification of the request information and to safely authenticate the request information from the client terminal which accesses the server.

BRIEF DESCRIPTION OF DRAWINGS

FIG. 2A is a diagram illustrating a display example of a check screen of transaction information which is input by a user of a PC.

FIG. 2B is a diagram illustrating a display example of a check screen of first transaction information in a mobile terminal.

FIG. 2C is a diagram illustrating a display example of the check screen of second transaction information in the mobile terminal.

FIG. 2D is a diagram illustrating a display example of the check screen of third transaction information in the mobile terminal.

FIG. 3 is a sequence diagram illustrating an example of the operational procedure of signaling between a PC, a mobile terminal, an information processing server and an authentication server in the authentication system according to the first embodiment in detail.

FIG. 10 is a sequence diagram illustrating an example of the operational procedure of signaling between a PC, a mobile terminal, an information processing server and an authentication server in the authentication system according to the third embodiment in detail.

DETAILED DESCRIPTION OF THE PREFERRED EMBODIMENT

Hereinafter, authentication systems according to embodiments will be described with reference to the accompanying drawings. The authentication system according to each of the embodiments includes a client terminal and a server which are connected through a network.

The client terminal requests the server to process request information (for example, transaction information such as Internet banking, setting information for giving authority to a specified person, and product trading information in Internet shopping) according to a user-input operation.

The server authenticates the client terminal in order to determine whether or not the request information, which is transmitted from the client terminal, could be processed. In the authentication system according to each of the embodiments, even if a communication path between the client terminal and the server is tapped through a man-in-the-middle attack (for example, an MITB attack) performed by a malicious third party and a part of the content of the request information is falsified, the server can detect a fact that a part of the content of the request information is falsified and does not process the request information, and thus it is possible to safely authenticate the request information from the client terminal which accesses the server.

In addition, in order to simply describe the embodiments below, transaction information related to the payment of electronic money in the Internet banking will be described as an example of the request information. Here, the request information is information for requesting the server to execute a process by the client terminal and information which should not be falsified by the malicious third party. Meanwhile, the embodiments can be realized as an authentication method which includes respective operations (steps) performed by respective devices (refer below) in an authentication system.

(First Embodiment)

Figure 1:
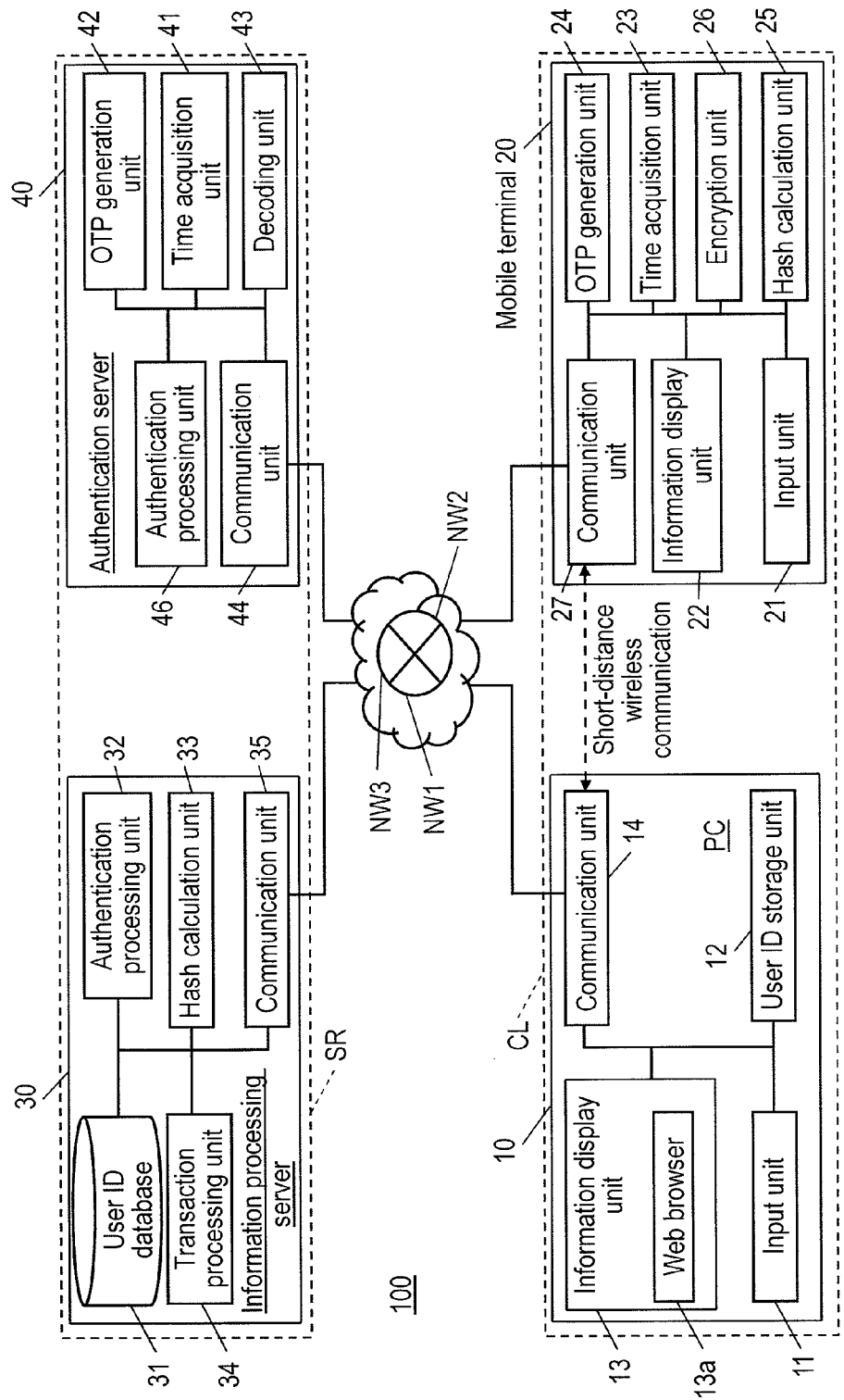
FIG. 1 is a block diagram illustrating the internal configuration of each of the units of an authentication system according to a first embodiment in detail.

FIG. 1 is a block diagram illustrating the internal configuration of each of the units of authentication system 100 according to a first embodiment in detail. Authentication system 100 shown in FIG. 1 includes Personal Computer (PC) 10, mobile terminal 20, information processing server 30, and authentication server 40. PC 10 and mobile terminal 20, which are examples of a user terminal, form client terminal CL in authentication system 100. Information processing server 30 and authentication server 40 form server SR in authentication system 100.

PC 10 is connected to information processing server 30 through network NW1. Network NW1 is, for example, the Internet and is a network with low security, which easily receives man-in-the-middle attacks performed by the malicious third party. In contrast, mobile terminal 20 is connected to information processing server 30 through network NW2. Network NW2 is, for example, a mobile communication network, such as 3G or Long Term Evolution (LTE), and is a network with high security compared to network NW1. Further, information processing server 30 is connected to authentication server 40 through network NW3. Network NW3 is, for example, a network with further high security compared to network NW1 and network NW2 like a Virtual Private Network (VPN) or a dedicated line. In addition, PC 10 and mobile terminal 20 are terminals which are possessed and used by the same user, and communicate with each other using prescribed short-distance wireless communication (for example, Bluetooth (registered trademark), Wifi (registered trademark), Near Field Communication (NFC), IrDA, or WiGig).

PC 10, which is an example of the user terminal, includes input unit 11, user ID storage unit 12, information display unit 13, and communication unit 14. Input unit 11 is used for the user-input operation (for example, a transaction information input operation), and is formed using, for example, a keyboard, a mouse, a hardware key (including buttons. The same applies hereinafter.), a touch panel, or a touch pad. The details of the content of the transaction information will be described later with reference to FIGS. 2A to 2D.

User ID storage unit 12 stores, for example, user identification information which is necessary when log-in is performed on the Web system of the Internet banking. Information display unit 13 displays data, which is acquired by Web browser 13a through communication with information processing server 30, and displays, for example, check screen BRS for the transaction information, shown in FIG. 2A. FIG. 2A illustrates check screen BRS for the transaction information which is input by the user of PC 10.

Communication unit 14, which is an example of a transmission unit, communicates with communication unit 35 of information processing server 30 through network NW1. In addition, communication unit 14 communicates with communication unit 27 of mobile terminal 20 using the prescribed short-distance wireless communication which is described above. Meanwhile, although PC 10 has been described as an example of the user terminal, the present invention is not limited to PC 10 and a tablet terminal, a smart phone or a mobile telephone may be used.

Mobile terminal 20 includes input unit 21, information display unit 22, time acquisition unit 23, OTP generation unit 24, hash calculation unit 25, encryption unit 26, and communication unit 27. Input unit 21 is used for the user-input operation (for example, an operation to accept the content of check screens CKS1 to CKS3 for the transaction information shown in FIGS. 2B to 2D), and is formed using, for example, a hardware key, a touch panel, or a touch pad. Information display unit 22 displays data acquired through short-distance wireless communication with PC 10 or a communication with information processing server 30 using network NW2, and displays, for example, check screens CKS1 to CKS3 for the transaction information shown in FIGS. 2B to 2D. FIG. 2B is a diagram illustrating a display example of check screen CKS1 for first transaction information in mobile terminal 20. FIG. 2C is a diagram illustrating a display example of check screen CKS2 for second transaction information in mobile terminal 20. FIG. 2D is a diagram illustrating a display example of check screen CKS3 for third transaction information in mobile terminal 20.

Time acquisition unit 23 acquires time information within mobile terminal 20. The One Time Password (OTP) generation unit 24, which is an example of an authentication information generation unit, generates a one-time password OTP, which has an available term of a prescribed period (for example, 10 minutes), as an example of authentication information for determining (authenticating) whether or not authentication server 40 may execute a process with regard to the transaction information transmitted from PC 10 to information processing server 30 using a user ID which is transmitted from PC 10 and the time information within mobile terminal 20 which is acquired by time acquisition unit 23. The one-time password OTP is frequently updated for every prescribed period. Therefore, when the one-time password OTP is used as an example of the authentication information, it is possible to defend the short-distance wireless communication between PC 10 and mobile terminal 20 and the communication between mobile terminal 20 and information processing server 30 against the man-in-the-middle attacks even if the man-in-the-middle attacks are performed between PC 10 and information processing server 30 by the malicious third party. Meanwhile, an existing algorithm (for example, One-Time Password System (RFC2289)) is used as a one-time password OTP generation algorithm in mobile terminal 20 and authentication server 40. In addition, if the authentication information is frequently updated for every prescribed period, the present invention is not limited to the one-time password OTP.

Meanwhile, the user ID is used when the one-time password OTP is generated. The reason for this is to enable the one-time password OTP to be generated for each of plurality of client terminals CL. If it is possible to identify each of the client terminals CL, identification information other than the user ID may be used.

In addition, OTP generation unit 24 may generate the one-time password OTP using the user ID which is transmitted from PC 10 and transaction date and time information which is included in the transaction information. In addition, OTP generation unit 24 may generate the one-time password OTP using the user ID which is transmitted from PC 10, the number of logins with regard to the Web system of Internet banking using the user ID, or the number of transactions.

Here, since the one-time password OTP is used as a common key (encryption key) in encryption unit 26, it is preferable that the length (size) of the one-time password OTP be the same as the length (size) of a common key (encryption key) in encryption unit 26. Therefore, it is possible to use the one-time password OTP itself as the common key in encryption unit 26.

However, the length of the one-time password OTP may be arbitrarily modified using, for example, existing PBKDF2 (RFC2898, PKCS#5, or v2). In addition, when the length of the one-time password OTP is different from the length of the common key (encryption key) and the length of the one-time password OTP is longer, a part of the one-time password is extracted or the length of the one-time password is shortened using a hash algorithm which will be described later such that the length of the one-time password is the same as the length of the common key (encryption key). When the length of the common key (encryption key) is longer than the length of the one-time password, a part or the entirety of the one-time password OTP may be repeatedly used or a user ID or the like may be added to the one-time password OTP.

In authentication system 100 according to the embodiment, mobile terminal 20 includes OTP generation unit 24 and authentication server 40 includes OTP generation unit 42. In authentication system 100, a one-time password OTP, which is generated by OTP generation unit 24 of mobile terminal 20, is synchronized with a one-time password OTP which is generated by OTP generation unit 42 of authentication server 40. In other words, authentication server 40 uses the same one-time password OTP as the one-time password OTP which is generated by mobile terminal 20. In authentication system 100, the one-time password OTP is a value which can be known to only mobile terminal 20 and authentication server 40. Therefore, in authentication system 100, authentication server 40 can safely authenticate whether or not a process with regard to the transaction information from PC 10 to information processing server 30 may be executed. In addition, the one-time password OTP, which is generated by mobile terminal 20, is synchronized with the one-time password OTP which is generated by authentication server 40. Therefore, when the available term of the one-time password OTP elapses, it is difficult for the malicious third party to read the one-time password OTP, and thus a possibility that the man-in-the-middle attacks are received is reduced.

Here, approximately two types of methods of authentication server 40 generating the same one-time password OTP as the one-time password OTP, which is generated by mobile terminal 20, will be described. In a first generation method, authentication server 40 receives the time information and the user ID within mobile terminal 20, which are used when mobile terminal 20 generates the one-time password OTP, from mobile terminal 20, and generates the one-time password OTP using the received time information and user ID within mobile terminal 20 without change. Therefore, according to the first generation method, mobile terminal 20 and authentication server 40 generate the one-time password OTP using the identification information of user terminal 10 which can be known to only mobile terminal 20 and authentication server 40. Therefore, for example, when the execution of the transaction information is requested from plurality of user terminals 10, it is possible to distinguish each of the user terminals and authenticate each of the user terminals.

In addition, in a second generation method, authentication server 40 receives the time information and the user ID within mobile terminal 20, which are used when mobile terminal 20 generates the one-time password OTP, from mobile terminal 20, and generates the one-time password OTP using the user ID and the time information within authentication server 40.

Here, a one-time password OTP generation time in authentication server 40 is after a one-time password OTP generation time in mobile terminal 20 because the one-time password OTP is generated in authentication server 40 after information is received from mobile terminal 20. Here, a communication time between mobile terminal 20 and authentication server 40, a user operation time, or the like is taken into a consideration, and a one-time password OTP generation cycle is set to, for example, 10 minutes, thereby preventing synchronization deviation due to the generation times from occurring. However, even though the cycle is provided, there is a case in which the one-time password OTP of mobile terminal 20 is not identical to the one-time password OTP of authentication server 40.

Here, in the second generation method, authentication server 40 has the same one-time password OTP generation cycle as that of mobile terminal 20, and generates a plurality of one-time passwords OTP every time using a plurality of pieces of previous time information (for example, 15:05, 15:15, and 15:25) including current time information (for example, 15:25), and the user ID which is transmitted from mobile terminal 20. Further, authentication server 40 selects a one-time password OTP, generated using the time information (for example, 15:15) which is identical to the time information within mobile terminal 20 (the generation time information of the one-time password OTP in mobile terminal 20) and the user ID, from three one-time passwords OTP, and uses the selected one-time password OTP. Therefore, in authentication system 100, authentication server 40 can generate the one-time password OTP acquired by synchronizing the one-time password OTP, which is generated by mobile terminal 20, with the one-time password OTP which is generated by authentication server 40.

Hash calculation unit 25 calculates a hash value A of the transaction information, which is transmitted from PC 10, according to a prescribed hash algorithm. In authentication system 100 according to the embodiment, mobile terminal 20 includes hash calculation unit 25, and information processing server 30 includes hash calculation unit 33. In authentication system 100, mobile terminal 20 and information processing server 30 calculate a hash value of input information according to the same hash algorithm. Meanwhile, for example, a secure hash function, such as existing SHA1, SHA256, or SHA512, is used for the hash algorithm, and the same applies hereinafter. Meanwhile, hash calculation unit 25 may generate a random number while seeding the transaction information instead of calculating the hash value A of the transaction information which is transmitted from PC 10, and the same applies hereinafter.

Encryption unit 26 uses the one-time password OTP generated by OTP generation unit 24 as a common key (encryption key), and generates encryption information B in which the hash value A of the transaction information, calculated by hash calculation unit 25, is encrypted. In authentication system 100 according to the embodiment, mobile terminal 20 includes encryption unit 26, and authentication server 40 includes decoding unit 43. Encryption unit 26 and decoding unit 43 share the same common key encryption algorithm (for example, AES or 3DES).

Meanwhile, a reason for a fact that the hash value A of the transaction information is not used as the common key (encryption key) and the one-time password OTP is used as the common key (encryption key) is that there is a possibility that information leaks and the common key (encryption key) is specified and falsified by the malicious third party because data flows on a communication path as in a case in which the transaction information is exchanged between PC 10 and information processing server 30. In contrast, since the one-time password OTP is not exchanged on the communication path, that is, does not flow on the communication path, the common key (encryption key) is not easily specified by the malicious third party, and thus it is possible to reduce a possibility of the falsification, thereby relieving a user who has user terminal 10. For example, when the information processing server is a server which is installed within a bank and the authentication server is a specified third party organization, there is no case in which the content of transaction information, which is transmitted from user terminal 10 according to a user-input operation, leaks to the third party organization.

Communication unit 27 as an example of the transmission unit communicates with communication unit 35 of information processing server 30 through network NW2. In addition, communication unit 27 communicates with communication unit 14 of PC 10 using the-above described prescribed short-distance wireless communication. Meanwhile, mobile terminal 20 may be formed using, for example, a hardware token, which has a one-time password OTP generation function and an information display function, in addition to a smart phone or a mobile telephone.

Information processing server 30 includes user ID database 31, authentication processing unit 32, hash calculation unit 33, transaction processing unit 34, and communication unit 35. User ID database 31 associates the user ID and a password, which are examples of the user identification information necessary to login to, for example, the Web system of Internet banking, with information relative to mobile terminal 20 possessed by the user, and stores the user ID and the password. Authentication processing unit 32, which is an example of the authentication unit, compares the hash value A of the transaction information, which is calculated by hash calculation unit 33 with regard to the transaction information transmitted from PC 10, with a hash value A' transmitted from authentication server 40 which will be described later, and outputs a result of the comparison to transaction processing unit 34.

Hash calculation unit 33 shares the same algorithm with hash calculation unit 25 of mobile terminal 20, and calculates the hash value A of the transaction information transmitted from PC 10. Based on the result of comparison from authentication processing unit 32, when the hash value A of the transaction information, which is calculated by hash calculation unit 33 with regard to the transaction information transmitted from PC 10, is identical to the hash value A' transmitted from authentication server 40 which will be described later, transaction processing unit 34 executes a process with regard to the transaction information transmitted from PC 10. In contrast, based on the result of comparison from authentication processing unit 32, when the hash value A of the transaction information, which is calculated by hash calculation unit 33 with regard to the transaction information transmitted from PC 10, is not identical to the hash value A' transmitted from authentication server 40 which will be described later, transaction processing unit 34 does not execute a process with regard to the transaction information transmitted from PC 10, notifies PC 10 of the fact, that is, the fact that the hash value A of the transaction information, which is calculated by hash calculation unit 33 with regard to the transaction information transmitted from PC 10, is not identical to the hash value A' transmitted from authentication server 40 which will be described later, and stops the provision of the use of the Web system of Internet banking.

Communication unit 35 which is an example of a reception unit communicates with PC 10 through network NW1, communicates with mobile terminal 20 through network NW2, and communicates with authentication server 40 through network NW3.

Authentication server 40 includes at least time acquisition unit 41, OTP generation unit 42, decoding unit 43, and communication unit 44. Meanwhile, authentication server 40 compares the hash value A of the transaction information, which is calculated by hash calculation unit 33 with regard to the transaction information transmitted from PC 10, with the hash value A', which is transmitted from authentication server 40 which will be described later, in authentication server 40 itself (refer to FIG. 4), authentication server 40 further includes authentication processing unit 46 which corresponds to authentication processing unit 32 of information processing server 30.

Time acquisition unit 41 acquires the time information within authentication server 40. OTP generation unit 42, which is an example of the authentication information generation unit, generates a one-time password OTP, which includes the available term of the prescribed period (for example, 10 minutes), as an example of the authentication information for determining (authenticating) whether or not authentication server 40 may execute a process with regard to the transaction information from PC 10 to information processing server 30 using the generation time information of the one-time password OTP of mobile terminal 20, which is transmitted from mobile terminal 20, the time information within authentication server 40, which is acquired from time acquisition unit 41, and the user ID which is transmitted from mobile terminal 20. Since the method of generating the one-time password OTP in (OTP generation unit 42 of) authentication server 40 has been described above, the description thereof will be omitted.

Decoding unit 43 has the same common key encryption algorithm as encryption unit 26 of mobile terminal 20, and decodes the encryption information B, which is transmitted from information processing server 30, while using the one-time password OTP, which is generated by OTP generation unit 42, as the common key (decode key). Decoding unit 43 derives the hash value A' by decoding the encryption information B. Communication unit 44 communicates with information processing server 30 through network NW3.

(Operational Procedure of First Signaling in Authentication System According to First Embodiment)

Subsequently, the operational procedure of each of the units in authentication system 100 according to the embodiment will be chronologically described in detail with reference to FIGS. 3 to 6.

First, the operational procedure of first signaling in authentication system 100 according to the embodiment will be described in detail with reference to FIG. 3. FIG. 3 is a sequence diagram illustrating an example of the operational procedure of signaling between PC 10, mobile terminal 20, information processing server 30, and authentication server 40 in authentication system 100 according to the first embodiment. A premise of description in FIG. 3 is a state in which the check screen of the transaction information (refer to FIG. 2A) is displayed on the screen of Web browser 13a as a result of the transaction information being input in the Internet banking by an input operation performed by the user using input unit 11.

In check screen BRS for the transaction information shown in FIG. 2A, a user ID, a transaction amount (for example, payment amount), a payment destination, and transaction date and time are displayed. The transaction information includes the transaction amount, the payment destination, and the transaction date and time. The transaction date and time indicate date and time in which the execution of the process with regard to the transaction information is requested by the user-input operation. Meanwhile, in the description with reference to the sequence diagrams in each of the embodiments below, description will be made while it is assumed that the subject of each operation is any one of the PC, the mobile terminal, the information processing server, and the authentication server which form the authentication system for easy understanding of the description.

In FIG. 3, after check screen BRS for the transaction information, which is displayed on the screen of Web browser 13a, is checked by a visual observation of the user, PC 10 transmits the transaction information and the user ID to information processing server 30 according to the user-input operation through network NW1 (S1), and transmits the transaction information and the user ID to mobile terminal 20 through short-distance wireless communication (S2). Meanwhile, the user may input the user ID by performing the input operation using input unit 21 of mobile terminal 20 or the user ID may be stored in the memory (not shown in the drawing) of mobile terminal 20 in advance, and the same applies hereinafter.

Mobile terminal 20 displays the check screen of the transaction information, which is transmitted from PC 10 (refer to FIGS. 2B to 2D) in step S2, on information display unit 22, and demands the user to check the content of the transaction information (S3). Meanwhile, information processing server 30 calculates the hash value A of the transaction information, which is transmitted from PC 10 in step S1, (S4).

The content of the transaction information, which is displayed on the screen of Web browser 13*a* of PC 10, and OK button B1, which indicates that the content is checked, are displayed on check screen CKS1 for the transaction information shown in FIG. 2B. When the content of the transaction information is checked by visual observation of the user on check screen CKS1 for the transaction information, which is displayed on information display unit 22 of mobile terminal 20, OK button B1 is pressed. When OK button B1 is pressed, a transaction information acceptance operation is performed by the user, and then operation of mobile terminal 20 proceeds to step S5.

The content of the transaction information which is displayed on the screen of Web browser 13*a* of PC 10, a check code ("48056" in the example shown in FIG. 2C) which includes an arbitrarily selected character image in mobile terminal 20, check code input field CF which causes the user to input the content of the input check code, and OK button B2, which indicates that the content of the transaction information and the input content of the check code are checked, are displayed on check screen CKS2 for the transaction information shown in FIG. 2C. When the content of the transaction information and the content of the input check code are checked by visual observation of the user, OK button B2 is pressed. When OK button B2 is pressed, the transaction information acceptance operation is performed by the user, and then operation of mobile terminal 20 proceeds to step S4. In this manner, when mobile terminal 20 displays the image character which is used as a countermeasure against spam, BOTs, or the like, and check code input field CF, which causes the user to actually input the content of the image character, on check screen CKS2 for the transaction information, it is difficult to automatically input the image character in the PC or the like and it is difficult to copy the check code onto camouflaged transaction information when the transaction information is camouflaged, and thus it is possible to block the camouflage of the transaction information performed by the malicious third party.

The content of the transaction information which is displayed on the screen of Web browser 13*a* of PC 10, a matrix MT using prescribed alphanumeric characters, a user password input field PF, and OK button B3, which indicates that the content of the transaction information, the content of the input transaction amount, and the password are checked, are displayed on check screen CKS3 for the transaction information shown in FIG. 2D. When the content of the transaction information, the content of the input transaction amount, and the password are checked by the visual observation of the user, OK button B3 is pressed. When OK button B3 is pressed, the transaction information acceptance operation is performed by the user, and then operation of mobile terminal 20 proceeds to step S4. In this manner, when mobile terminal 20 causes the user to input the password using the alphanumeric characters displayed in the matrix MT, it is possible to avoid the man-in-the-middle attacks using, for example, key logger spyware by the malicious third party.

Meanwhile, when mobile terminal 20 stores a white list, in which the transaction information, such as payment destination or transaction limit amount for each user ID, is defined, in the memory (not shown in the drawing) and when the content of the transaction information transmitted from PC 10 is identical to the content of the white list corresponding to a relevant user ID in step S2, a process in step S3 may be omitted. In addition, when the process in step S3 is omitted, it is possible to use a hardware token, which has no display, or the like.

After the process in step S3 is performed, mobile terminal 20 calculates the hash value A of the transaction information, which is transmitted from PC 10 in step S2, (S5), and generates the one-time password OTP using the user ID and the time information of mobile terminal 20 which are transmitted from PC 10 in step S2 (S6). Mobile terminal 20 generates the encryption information B, acquired by encrypting the hash value A calculated in step S5, while using the one-time password OTP, which is generated in step S6, as the common key (encryption key) which is common to authentication server 340 (S7), and transmits the encryption information B and the user ID to information processing server 30 through network NW2 (S8).

Meanwhile, mobile terminal 20 may encrypt the content of the transaction information itself using the one-time password OTP while not encrypting the hash value A of the transaction information in step S7, and may transmit the encryption information, which is acquired by encrypting the content of the transaction information itself using the one-time password OTP in step S8, to information processing server 30 together with the user ID, and the same applies hereinafter.

Information processing server 30 transmits the encryption information B, which is transmitted from mobile terminal 20 in step S8, and the user ID which is transmitted from PC 10 in step S1, to authentication server 40 through network NW3 (S9).

When authentication server 40 receives the encryption information B and the user ID which are transmitted from information processing server 30 in step S9, authentication server 40 generates the one-time password OTP using, for example, the user ID and the time information of authentication server 40 (S10). The one-time password OTP, which is generated in step S10, is synchronized with the one-time password OTP, which is generated by mobile terminal 20 in step S6, and thus the one-time passwords OTP are identical to each other. Meanwhile, since the method of generating the one-time password OTP in authentication server 40 has been described above, the description thereof will be omitted.

Authentication server 40 decodes the encryption information B, which is transmitted from information processing server 30 in step S9, while using the one-time password OTP, which is generated in step S10, as the common key (decode key) which is common to mobile terminal 20 (S11). Authentication server 40 derives the hash value A' as the reference information through the decoding performed in step S11 (S11), and transmits the hash value A' to information processing server 30 (S12). Here, the reference information is, for example, comparison target information, which is used to determine whether or not the transaction information transmitted from user terminal 10 or mobile terminal 20 is falsified on the communication path when an authentication process is performed in authentication processing unit 32 of information processing server 30 or authentication processing unit 46 of authentication server 40. Meanwhile, when not the hash value A of the transaction information but the content of the transaction information itself is encrypted in step S7, authentication server 40 derives the content of the transaction information itself by decoding the encryption information B in step S11, and the same process is performed below.

In addition, in steps S10 to S12, information processing server 30 may determine whether or not to execute the process with regard to the transaction information transmitted from PC 10 in step S1 by transmitting the hash value A of the transaction information, which is calculated in step S4, and the user ID to authentication server 40 and comparing the encryption information B, in which the hash value A of the transaction information is encrypted using the one-time password OTP in authentication server 40, with the encryption information B which is transmitted from mobile terminal 20 in step S8, and the same applies hereinafter. However, in this case, it is necessary that authentication server 40 further includes an encryption unit which shares the same common key encryption algorithm with encryption unit 26 of mobile terminal 20.

Information processing server 30 compares the hash value A of the transaction information, which is calculated in step S4, with the hash value A' as the reference information which is transmitted from authentication server 40 in step S12. When it is determined that the hash value A and the hash value A' are equivalent (identical), it is assumed that the content of the transaction information transmitted from PC 10 in step S1 is correct (true), and the process with regard to the content of the transaction information is executed (S13).

As above, in the sequence shown in FIG. 3, authentication system 100 according to the embodiment shares the one-time password OTP in mobile terminal 20 and authentication server 40, and compares the hash value A of the transaction information, which is calculated by information processing server 30, with the hash value A', which is derived by decoding the encryption information B encrypted in such a way that mobile terminal 20 encrypts the hash value A of the transaction information using the one-time password OTP, in information processing server 30.

Therefore, when authentication system 100 determines that the hash value A of the transaction information is identical to the hash value A' which is transmitted from authentication server 40, it is possible to detect that man-in-the-middle attacks performed by the malicious third party do not occur on the communication path between PC 10 and information processing server 30 or on the communication path between mobile terminal 20 and information processing server 30. In addition, since authentication system 100 can determine that the middle attacks performed by the malicious third party do not occur, it is possible to safely authenticate PC 10 in authentication server 40, and it is possible to safely execute the process with regard to the transaction information in information processing server 30. When authentication system 100 determines that the hash value A of the transaction information is not identical to the hash value A' which is transmitted from authentication server 40, it is possible to detect that man-in-the-middle attacks performed by the malicious third party occur on the communication path between PC 10 and information processing server 30, the communication path between mobile terminal 20 and information processing server 30, or both the communication paths. In this case, since there is a strong possibility that a part or the entirety of the content of the transaction information is falsified, authentication system 100 stops the execution of the process with regard to the transaction information, which is input from PC 10, in information processing server 30, and thus it is possible to reduce damage to the user due to the man-in-the-middle attacks.

(Operational Procedure of Second Signaling in Authentication System According to First Embodiment)

Figure 4:
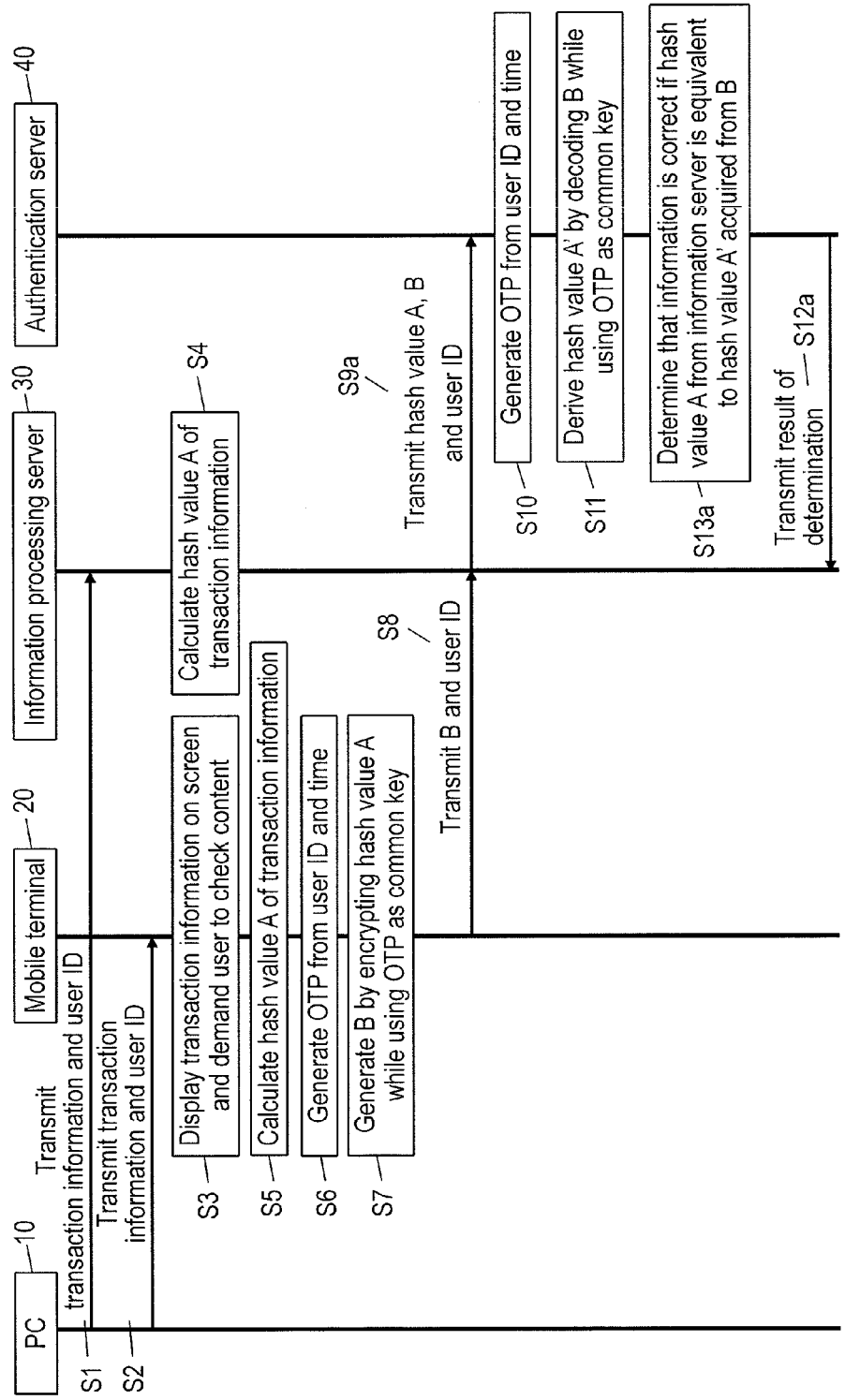
FIG. 4 is a sequence diagram illustrating a first modified example of the operational procedure of signaling between the PC, the mobile terminal, the information processing server and the authentication server in the authentication system according to the first embodiment in detail.

Subsequently, the operational procedure of second signaling in authentication system 100 according to the embodiment will be described in detail with reference to FIG. 4. FIG. 4 is a sequence diagram illustrating a first modified example of the operational procedure of signaling between PC 10, mobile terminal 20, information processing server 30 and authentication server 40 in authentication system 100 according to the first embodiment in detail. A premise of description in FIG. 4 is a state in which the check screen of the transaction information (refer to FIG. 2A) is displayed on the screen of Web browser 13*a* as a result of the transaction information being input in the Internet banking by an input operation performed by the user using input unit 11. Meanwhile, in the description of the sequence shown in FIG. 4, the same step number is attached to the same operation of the sequence shown in FIG. 3, and the description of the same content will be omitted or simplified.

In FIG. 4, after a process in step S8, information processing server 30 transmits the hash value A of the transaction information which is calculated in step S4, the encryption information B which is transmitted from mobile terminal 20 in step S8, and the user ID which is transmitted from PC 10 in step S1 to authentication server 40 through network NW3 (S9*a*). Meanwhile, in step S9*a*, information processing server 30 may transmit the content of the transaction information itself, which is transmitted from PC 10 in step S1, to authentication server 40 instead of the hash value A of the transaction information. In this case, it is possible to omit the process in step S4, and authentication server 40 includes a hash calculation unit which shares the same hash algorithm with hash calculation unit 33 of information processing server 30, and the hash value A of the transaction information, which is transmitted from information processing server 30, is calculated in the hash calculation unit.

After the process in step S11, authentication server 40 compares the hash value A, which is transmitted from information processing server 30 in step S9*a*, with the hash value A' as the reference information which is derived by performing decoding in step S11 (S13*a*). When it is determined that the hash value A is equivalent (identical) to the hash value A', a result of determination which indicates that the content of the transaction information transmitted from PC 10 in step S1 is correct (true) is transmitted to information processing server 30 (S12*a*). In this case, information processing server 30 executes the process with regard to the content of the transaction information according to the result of determination received from authentication server 40 in step S12*a*.

Meanwhile, in step S11 and step S13*a*, authentication server 40 may generate the encryption information B acquired by encrypting the hash value A of the transaction information, which is transmitted from information processing server 30 in step S9*a*, while using the one-time password OTP, which is generated in step S10, as the common key (encryption key) which is common to mobile terminal 20, and may compare the generated encryption information B with the encryption information B, which is transmitted from information processing server 30 in step S9*a*. In this case, authentication server 40 includes an encryption unit that shares the same common key encryption algorithm with encryption unit 26 of mobile terminal 20, and calculates the encryption information B acquired by encrypting the hash value A of the transaction information, which is transmitted from information processing server 30, using the one-time password OTP in the encryption unit.

As above, in the sequence shown in FIG. 4, authentication system 100 according to the embodiment shares the one-time password OTP in mobile terminal 20 and authentication server 40, and compares the hash value A of the transaction information, which is transmitted from information processing server 30, with the hash value A', which is derived by decoding the encryption information B, acquired in such a way that mobile terminal 20 encrypts the hash value A of the transaction information using the one-time password OTP, in authentication server 40. Therefore, authentication system 100 can acquire the same advantage as in the sequence shown in FIG. 3, with the result that it is possible to omit the process of comparing the hash value A of the transaction information in information processing server 30 with the hash value A' which is derived by decoding the encryption information B, and thus it is possible to reduce the throughput of information processing server 30.

(Operational Procedure of Third Signaling in Authentication System According to First Embodiment)

Figure 5:
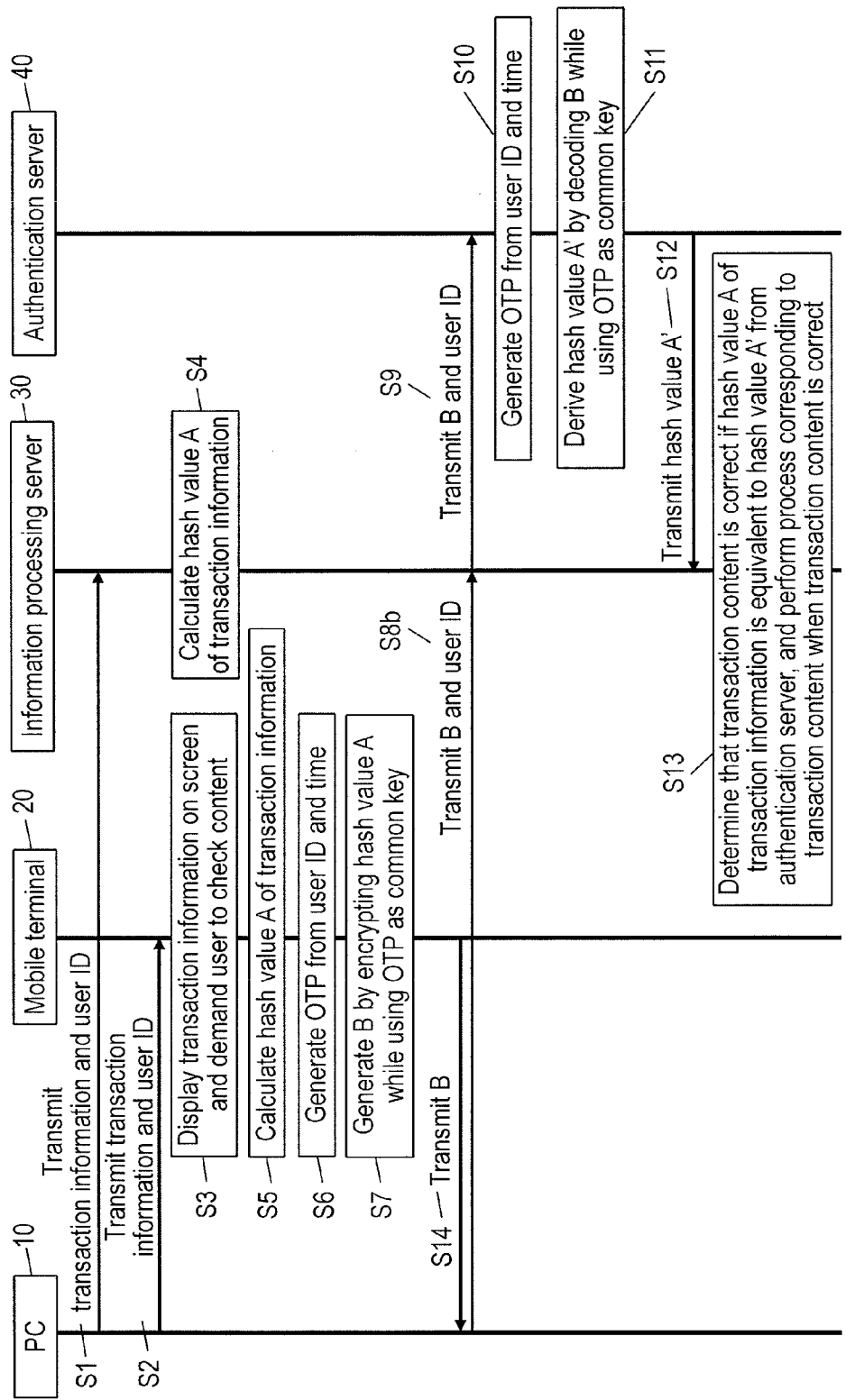
FIG. 5 is a sequence diagram illustrating a second modified example of the operational procedure of signaling between the PC, the mobile terminal, the information processing server and the authentication server in the authentication system according to the first embodiment in detail.

Subsequently, the operational procedure of third signaling in authentication system 100 according to the embodiment will be described with reference to FIG. 5. FIG. 5 is a sequence diagram illustrating a second modified example of the operational procedure of signaling between PC 10, mobile terminal 20, information processing server 30 and authentication server 40 in authentication system 100 according to the first embodiment in detail. A premise of description in FIG. 5 is a state in which the check screen of the transaction information (refer to FIG. 2A) is displayed on the screen of Web browser 13a as a result of the transaction information being input in the Internet banking by the input operation performed by the user using input unit 11. Meanwhile, in the description of the sequence shown in FIG. 5, the same step number is attached to the same operation of the sequence shown in FIG. 3, and the description of the same content will be omitted or simplified.

In FIG. 5, after the process in step S7 is performed, mobile terminal 20 transmits the encryption information B, which is generated in step S7, to PC 10 using short-distance wireless communication (S14). After PC 10 receives the encryption information B, which is transmitted from mobile terminal 20 in step S14, PC 10 transmits the encryption information B and the user ID to information processing server 30 through network NW1 (S8b). Since operations following step S9 in the sequence shown in FIG. 5 are the same as the operations following step S9 in the sequence shown in FIG. 3, the description thereof will be omitted.

As above, in the sequence shown in FIG. 5, authentication system 100 according to the embodiment shares the one-time password OTP between mobile terminal 20 and authentication server 40, does not require communication between mobile terminal 20 and information processing server 30, and compares the hash value A of the transaction information, which is transmitted from information processing server 30, with the hash value A', which is derived by decoding the encryption information B acquired in such a way that mobile terminal 20 encrypts the hash value A of the transaction information using the one-time password OTP, in information processing server 30. Therefore, authentication system 100 can acquire the same advantage as in the sequence shown in FIG. 3, with the result that it is possible to omit the communication performed between mobile terminal 20 and information processing server 30, and thus it is possible to suppress the generation of the man-in-the-middle attacks on the communication path between mobile terminal 20 and information processing server 30. Accordingly, in the example of the sequence shown in FIG. 5, mobile terminal 20 is preferable to a case of a hardware token which does not include a communication function.

(Operational Procedure of Fourth Signaling in Authentication System According to First Embodiment)

Figure 6:
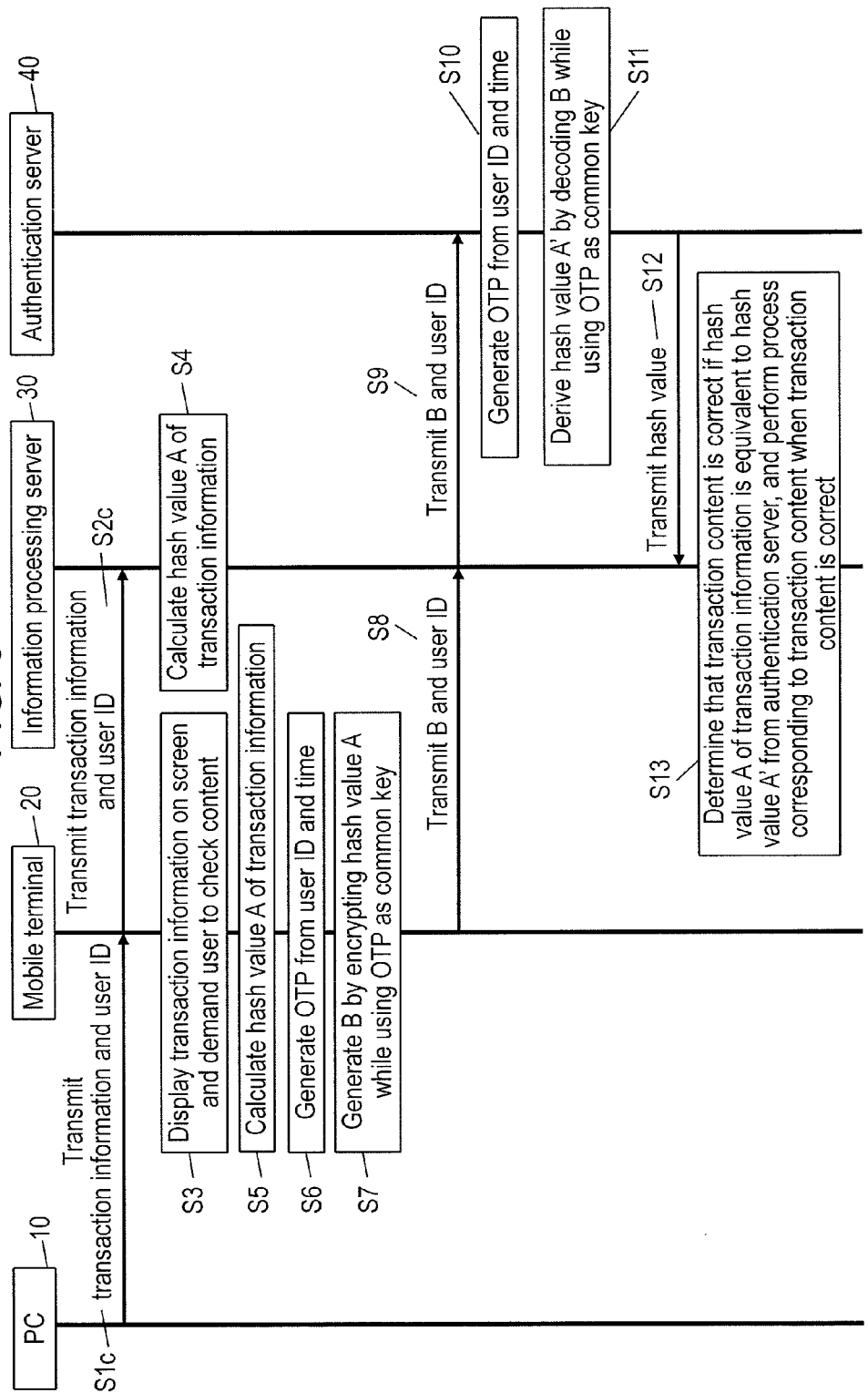
FIG. 6 is a sequence diagram illustrating a third modified example of the operational procedure of signaling between the PC, the mobile terminal, the information processing server and the authentication server in the authentication system according to the first embodiment in detail.

Subsequently, the operational procedure of fourth signaling in authentication system 100 according to the embodiment will be described in detail with reference to FIG. 6. FIG. 6 is a sequence diagram illustrating a third modified example of the operational procedure of signaling between PC 10, mobile terminal 20, information processing server 30 and authentication server 40 in the authentication system according to the first embodiment in detail. A premise of description in FIG. 6 is a state in which the check screen of the transaction information (refer to FIG. 2A) is displayed on the screen of Web browser 13a as a result of the transaction information being input in the Internet banking by the input operation performed by the user using input unit 11. Meanwhile, in the description of the sequence shown in FIG. 6, the same step number is attached to the same operation of the sequence shown in FIG. 3, and the description of the same content will be omitted or simplified.

In FIG. 6, after the check screen of the transaction information, which is displayed on the screen of Web browser 13a, is checked by visual observation of the user, PC 10 transmits the transaction information and the user ID to mobile terminal 20 according to the user-input operation through short-distance wireless communication (S1c). Mobile terminal 20 transmits the transaction information and the user ID, which are transmitted from PC 10 in step S1c, to information processing server 30 through short-distance wireless communication (S2c). Since operations following step S3 in the sequence shown in FIG. 6 are the same as the operations following step S3 in the sequence shown in FIG. 3, the description thereof will be omitted.

As above, in the sequence shown in FIG. 6, authentication system 100 according to the embodiment shares the one-time password OTP between mobile terminal 20 and authentication server 40, does not require the communication between PC 10 and information processing server 30, and compares the hash value A of the transaction information, which is transmitted from information processing server 30, with the hash value A', which is derived by decoding the encryption information B acquired in such a way that mobile terminal 20 encrypts the hash value A of the transaction information using the one-time password OTP, in information processing server 30. Therefore, authentication system 100 can acquire the same advantage as in the sequence shown in FIG. 3, with the result that it is possible to omit the communication between PC 10 and information processing server 30, and thus it is possible to suppress the generation of the man-in-the-middle attacks on the communication path between PC 10 and information processing server 30.

Meanwhile, in authentication system 100 according to the embodiment, the communication partners of the respective units may be arbitrarily combined in the sequence shown in FIG. 4 and the sequence shown in FIG. 5. For example, in authentication system 100, communication with information processing server 30 is performed by PC 10 instead of mobile terminal 20, and the comparison of the hash value A of the transaction information with the hash value A, which is derived by decoding the encryption information B, may be performed in authentication server 40.

In addition, in the same manner, in authentication system 100 according to the embodiment, the communication partners of the respective units may be arbitrarily combined in the sequence shown in FIG. 4 and the sequence shown in FIG. 6. For example, in authentication system 100, communication with information processing server 30 is performed by mobile terminal 20 instead of PC 10, and the comparison of the hash value A of the transaction information with the hash value A, which is derived by decoding the encryption information B, may be performed in authentication server 40.

(Second Embodiment)

Figure 7:
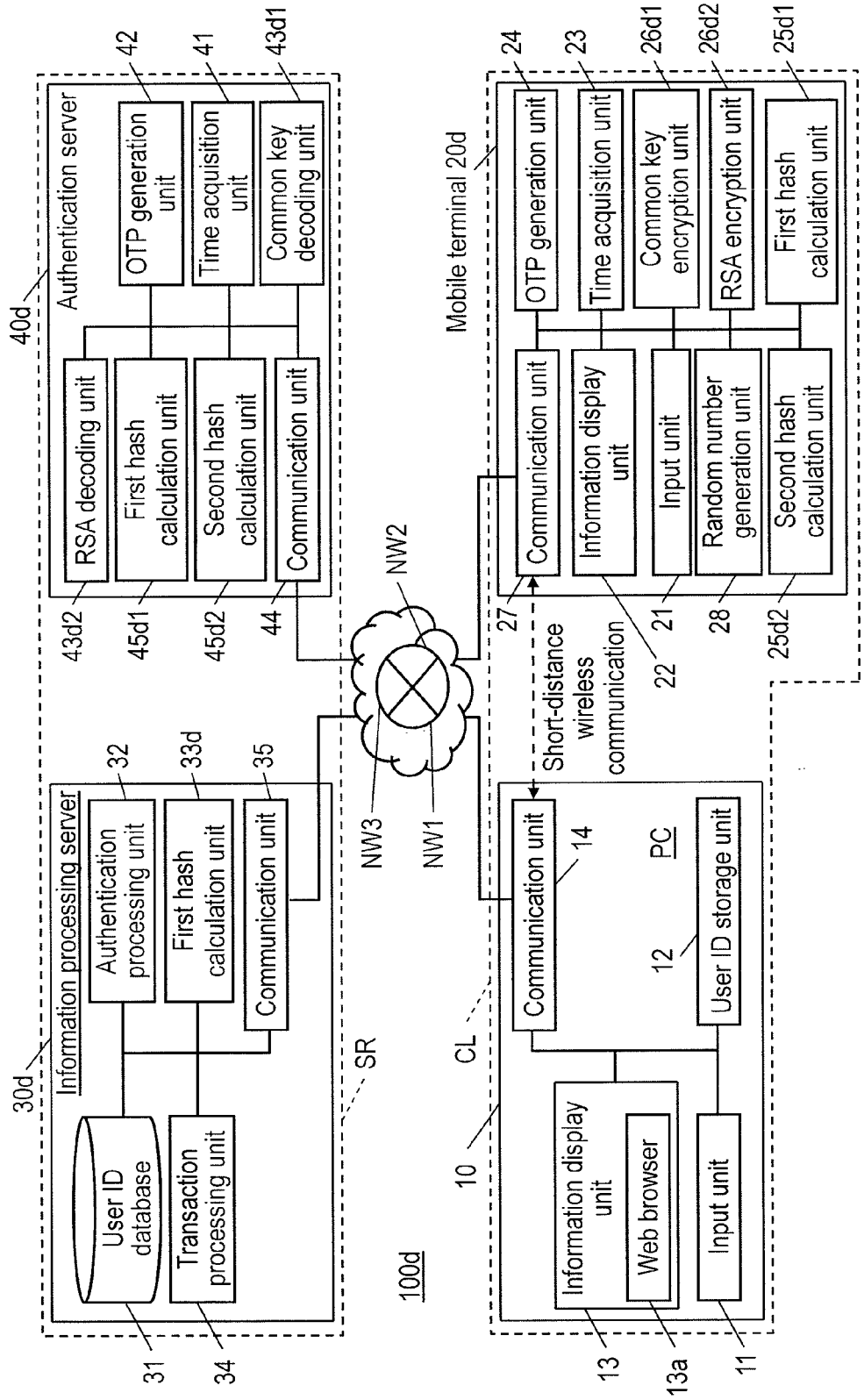
FIG. 7 is a block diagram illustrating the internal configuration of each of the units of an authentication system according to a second embodiment in detail.

FIG. 7 is a block diagram illustrating the internal configuration of each of the units of authentication system 100d according to a second embodiment in detail. Authentication system 100d shown in FIG. 7 includes PC 10, mobile terminal 20d, information processing server 30d, and authentication server 40d. PC 10 and mobile terminal 20d, which are examples of a user terminal, form client terminal CL in authentication system 100d. Information processing server 30d and authentication server 40d form a server SR in authentication system 100d. In description of each of the units of authentication system 100d shown in FIG. 7, the same reference numeral is are attached to the a unit having the same content as each of the units of authentication system 100 shown in FIG. 1, the description thereof is omitted or simplified, and different content will be described.

Mobile terminal 20d includes input unit 21, information display unit 22, time acquisition unit 23, OTP generation unit 24, first hash calculation unit 25d1, second hash calculation unit 25d2, common key encryption unit 26d1, RSA encryption unit 26d2, communication unit 27, and random number generation unit 28.

First hash calculation unit 25d1 calculates the hash value A of the transaction information, which is transmitted from PC 10, according to the prescribed first hash algorithm. In authentication system 100d according to the embodiment, mobile terminal 20d includes first hash calculation unit 25d1, and information processing server 30d includes a first hash calculation unit 33d, and authentication server 40d includes first hash calculation unit 45d1. In authentication system 100d, mobile terminal 20d, information processing server 30d, and authentication server 40d share the same first hash algorithm, and calculates the hash value of input information.

Second hash calculation unit 25d2 calculates the hash value (for example, hash value H) of the input information (for example, random number r) according to a prescribed second hash algorithm, and calculates the hash value (for example, hash value H') of another piece of input information (for example, random number r'). In authentication system 100d according to the embodiment, mobile terminal 20d includes second hash calculation unit 25d2, and authentication server 40d includes second hash calculation unit 45d2. In authentication system 100d, mobile terminal 20d and authentication server 40d share the same second hash algorithm, and calculate the hash value of the input information.

Meanwhile, the first hash algorithm is different from the second hash algorithm. In addition, the output of each of the first hash calculation units in mobile terminal 20d, information processing server 30d, and authentication server 40d may be a value which is acquired by performing hash calculation on the output of each of the second hash calculation units in mobile terminal 20d and authentication server 40d in a plurality of times. In the same manner, the output of each of the second hash calculation units in mobile terminal 20d and authentication server 40d may be a value which is acquired by performing hash calculation on the output of each of the first hash calculation units in mobile terminal 20d, information processing server 30d, and authentication server 40d in a plurality of times.

Common key encryption unit 26d1, which is an example of the request information encryption unit, shares the same common key encryption algorithm as in encryption unit 26 of mobile terminal 20 shown in FIG. 1, and encrypts the pieces of input information, respectively, while using the hash value A of the transaction information or the one-time password OTP as a common key (encryption key).

RSA encryption unit 26d2, which is an example of a random number encryption unit, performs RSA encryption on the input information using the public key of authentication server 40d according to, for example, the RSA public key encryption algorithm. Mobile terminal 20d holds the public key of authentication server 40d in advance, or acquires the public key from authentication server 40d. Meanwhile, RSA encryption unit 26d2 may encrypt the input information using the public key of authentication server 40d according to another public key encryption algorithm (for example, Diffie Hellman (DH) key exchange, the Elgamal code, or an elliptic curve code) instead of the RSA public key encryption algorithm. In this case, mobile terminal 20d shares another public key encryption algorithm with authentication server 40d in advance. The random number generation unit 28 generates an arbitrary random number r.

Information processing server 30d includes user ID database 31, authentication processing unit 32, first hash calculation unit 33d, transaction processing unit 34, and communication unit 35. First hash calculation unit 33d calculates the hash value A of the transaction information, which is transmitted from PC 10, according to the prescribed first hash algorithm. First hash calculation unit 33d shares the same first hash algorithm between first hash calculation unit 25d1 of mobile terminal 20d and first hash calculation unit 45d1 of authentication server 40d, and calculates the hash value of the input information. Meanwhile, information processing server 30d may include the second hash calculation unit, which has the same hash algorithm as in second hash calculation unit 25d2 of mobile terminal 20d instead of first hash calculation unit 33d.

Authentication server 40d includes at least time acquisition unit 41, OTP generation unit 42, common key decoding unit 43d1, RSA decoding unit 43d2, communication unit 44, first hash calculation unit 45d1, and second hash calculation unit 45d2. Common key decoding unit 43d1 shares the same common key encryption algorithm with common key encryption unit 26d1 of mobile terminal 20d, and decodes the pieces of input information, respectively, while using the hash value A of the transaction information and the one-time password OTP as the common key (decode key).

RSA decoding unit 43d2 shares the same RSA public key encryption algorithm with RSA encryption unit 26d2 of mobile terminal 20d, and performs RSA decoding on the input information using the private key of authentication server 40d. Authentication server 40d holds the private key of authentication server 40d in advance. Meanwhile, RSA decoding unit 43d2 may decode the input information using the public key of authentication server 40d according to another public key encryption algorithm (for example, Diffie Hellman (DH) key exchange, an Elgamal code, or an elliptic curve code) instead of the RSA public key encryption algorithm. In this case, authentication server 40*d* shares another public key encryption algorithm with mobile terminal 20*d* in advance.

First hash calculation unit 45*d*1 calculates the hash value G' of the input information (for example, a random number r' which will be described later) according to the prescribed first hash algorithm. Second hash calculation unit 45*d*2 calculates the hash value (for example, hash value H) of the input information (for example, random number r) according to the prescribed second hash algorithm, and calculates the hash value (for example, hash value H') of another input information (for example, random number r').

(Operational Procedure of Signaling in Authentication System According to Second Embodiment)

Figure 8:
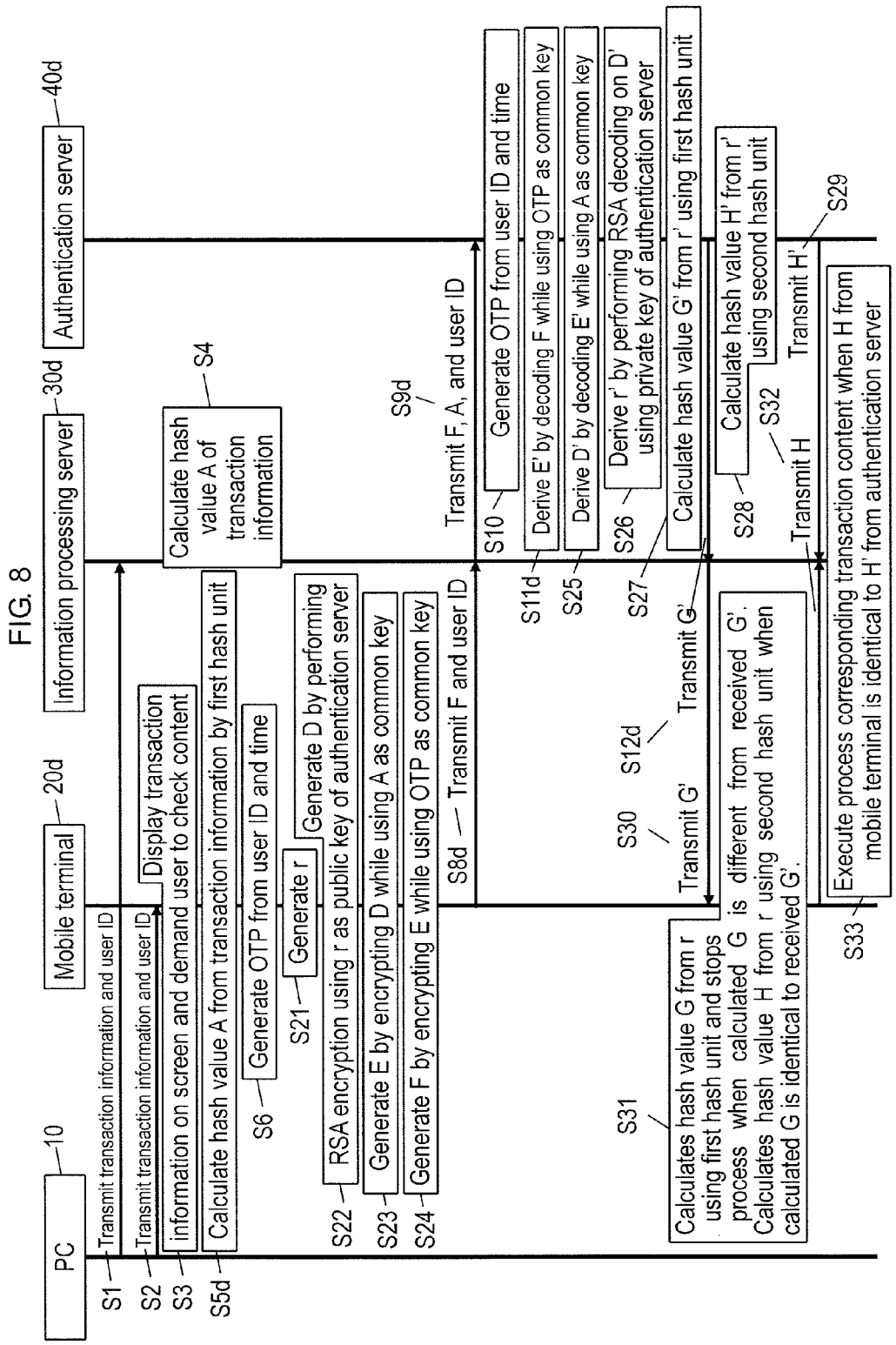
FIG. 8 is a sequence diagram illustrating an example of the operational procedure of signaling between a PC, a mobile terminal, an information processing server and an authentication server in the authentication system according to the second embodiment in detail.

Subsequently, the operational procedure of each of the units in authentication system 100*d* according to the embodiment will be chronologically described in detail with reference to FIG. 8. FIG. 8 is a sequence diagram illustrating an example of the operational procedure of signaling between PC 10, mobile terminal 20*d*, information processing server 30*d*, and authentication server 40*d* in authentication system 100*d* according to the second embodiment in detail. A premise of description in FIG. 8 is a state in which the check screen of the transaction information (refer to FIG. 2A) is displayed on the screen of Web browser 13*a* as a result of the transaction information being input in the Internet banking by the input operation performed by the user using input unit 11. Meanwhile, in the description of the sequence shown in FIG. 8, the same step number is attached to the same operation of the sequence shown in FIG. 3, and the description of the same content will be omitted or simplified.

In FIG. 8, after a process in step S3 is performed, mobile terminal 20*d* calculates the hash value A of the transaction information, which is transmitted from PC 10 in step S2, in first hash calculation unit 25*d*1 (S5*d*). After a process in step S6 is performed, mobile terminal 20*d* generates an arbitrary random number r, which is used in an existing Password Authenticated Key Exchange (PAKE) code (S21), and generates first encryption information (encryption random number) D, which is acquired by performing RSA encryption on the random number r, which is generated in step S21, using the public key of authentication server 40*d* (S22). Mobile terminal 20*d* generates second encryption information (encryption request information) E, acquired by encrypting the first encryption information (encryption random number) D, which is generated in step S22, while using the hash value A of the transaction information, which is calculated in step S5*d*, as the common key (encryption key) which is common to authentication server 40*d* (S23).

Meanwhile, in step S23, mobile terminal 20*d* may generate the second encryption information E, acquired by encrypting the first encryption information D which is generated in step S22, while using the hash value A of the transaction information as the common key (encryption key), for example, using AES, or may generate the second encryption information E by deriving the common key (encryption key) having the same length (size) as the first encryption information D based on the hash value A of the transaction information using, for example, existing PBKDF2 and by calculating the exclusive OR of the derived common key (encryption key) and the first encryption information D.

Further, mobile terminal 20*d* generates third encryption information F acquired by encrypting the second encryption information (encryption request information) E, which is generated in step S23, while using the one-time password OTP, which is generated in step S6, as the common key (encryption key) which is common to authentication server 340 (S24), and transmits the third encryption information F and the user ID to information processing server 30 through network NW2 (S8*d*).

Information processing server 30*d* transmits the third encryption information F which is transmitted from mobile terminal 20*d* in step S8*d*, the hash value A of the transaction information, which is calculated in step S4, and the user ID which is transmitted from PC 10 in step S1 to authentication server 40*d* through network NW3 (S9*d*).

After a process in step S10 is performed, authentication server 40*d* decodes the third encryption information F, which is transmitted from information processing server 30*d* in step S9*d* while using the one-time password OTP, which is generated in step S10, as the common key (decode key) which is common to mobile terminal 20*d* (S11*d*). Authentication server 40*d* derives the first decode information E' through the decoding performed in step S11*d* (S11*d*), and decodes the first decode information E' which is derived in step S11*d* while using the hash value A of the transaction information, which is transmitted from information processing server 30*d* in step S9*d*, as the common key (decode key) which is common to mobile terminal 20*d* (S25). Authentication server 40*d* derives second decode information D' through the decoding performed in step S25 (S25), and performs the RSA decoding on the second decode information D' which is derived in step S25 using the private key of authentication server 40*d* (S26). Authentication server 40*d* derives the random number r' as the third decode information through the RSA decoding performed in step S26 (S26), and calculates the hash value G' of the random number r' in first hash calculation unit 45*d*1 (S27).

Authentication server 40*d* transmits the hash value G', which is calculated in step S27, to information processing server 30*d* through network NW3 (S12*d*), and calculates the hash value H' of the random number r' in second hash calculation unit 45*d*2 and transmits the hash value H' of the random number r' to information processing server 30*d* (S28, S29).

Information processing server 30*d* transmits the hash value G', which is transmitted in step S12*d*, to mobile terminal 20*d* through network NW2 (S30).

When mobile terminal 20*d* receives the hash value G' which is transmitted from information processing server 30*d* in step S30, mobile terminal 20*d* calculates the hash value G of the random number r, which is generated in step S21, in first hash calculation unit 25*d*1 (S31). Mobile terminal 20*d* compares the hash value G, which is calculated in step S31, with the hash value G' which is transmitted from information processing server 30*d* in step S30. When it is determined that the hash value G is not equivalent (identical) to the hash value G', mobile terminal 20*d* stops to request information processing server 30*d* to execute a process with regard to the transaction information which is input from PC 10 (S31).

When it is determined that the hash value G is equivalent (identical) to the hash value G', mobile terminal 20*d* calculates the hash value H of the random number r, which is generated in step S21, in second hash calculation unit 25*d*2 and transmits the hash value H of the random number r to information processing server 30*d* (S32).

Information processing server 30*d* compares the hash value H', which is transmitted from authentication server 40*d* in step S29, with the hash value H which is transmitted from mobile terminal 20*d* in step S32. When it is determined that the hash value H is equivalent (identical) to the hash value H', it is assumed that the content of the transaction information transmitted from PC 10 in step S1 is correct (true), and the process with regard to the content of the transaction information is executed (S33).

As above, authentication system 100*d* according to the embodiment shares the same one-time password OTP in mobile terminal 20*d* and authentication server 40*d*, shares the same hash algorithm in first hash calculation units 25*d*1 and 45*d*1, shares the same hash algorithm in second hash calculation units 25*d*2 and 45*d*2, and shares the same RSA public key encryption algorithm in RSA encryption unit 26*d*2 and RSA decoding unit 43*d*2. Further, authentication system 100*d* performs encryption using the PAKE encryption algorithm using an arbitrary random number r and the RSA public key encryption algorithm in addition to the encryption of the hash value A of the transaction information using the one-time password OTP according to the first embodiment.

Therefore, compared to the advantage of authentication system 100 according to the first embodiment, authentication system 100*d* can have further strong security by using various types of encryption algorithms, in which the one-time password OTP, the random number r, and the PAKE code using the RSA public key encryption algorithm are collectively used, with regard to the man-in-the-middle attacks (for example, analysis of the one-time password OTP) performed by the malicious third party on the communication path between mobile terminal 20*d* and information processing server 30*d*. Therefore, compared to authentication system 100 according to the first embodiment, authentication system 100*d* can further safely authenticate PC 10 in authentication server 40, and thus it is possible to further safely perform the process with regard to the transaction information in information processing server 30.

(Third Embodiment)

Figure 9:
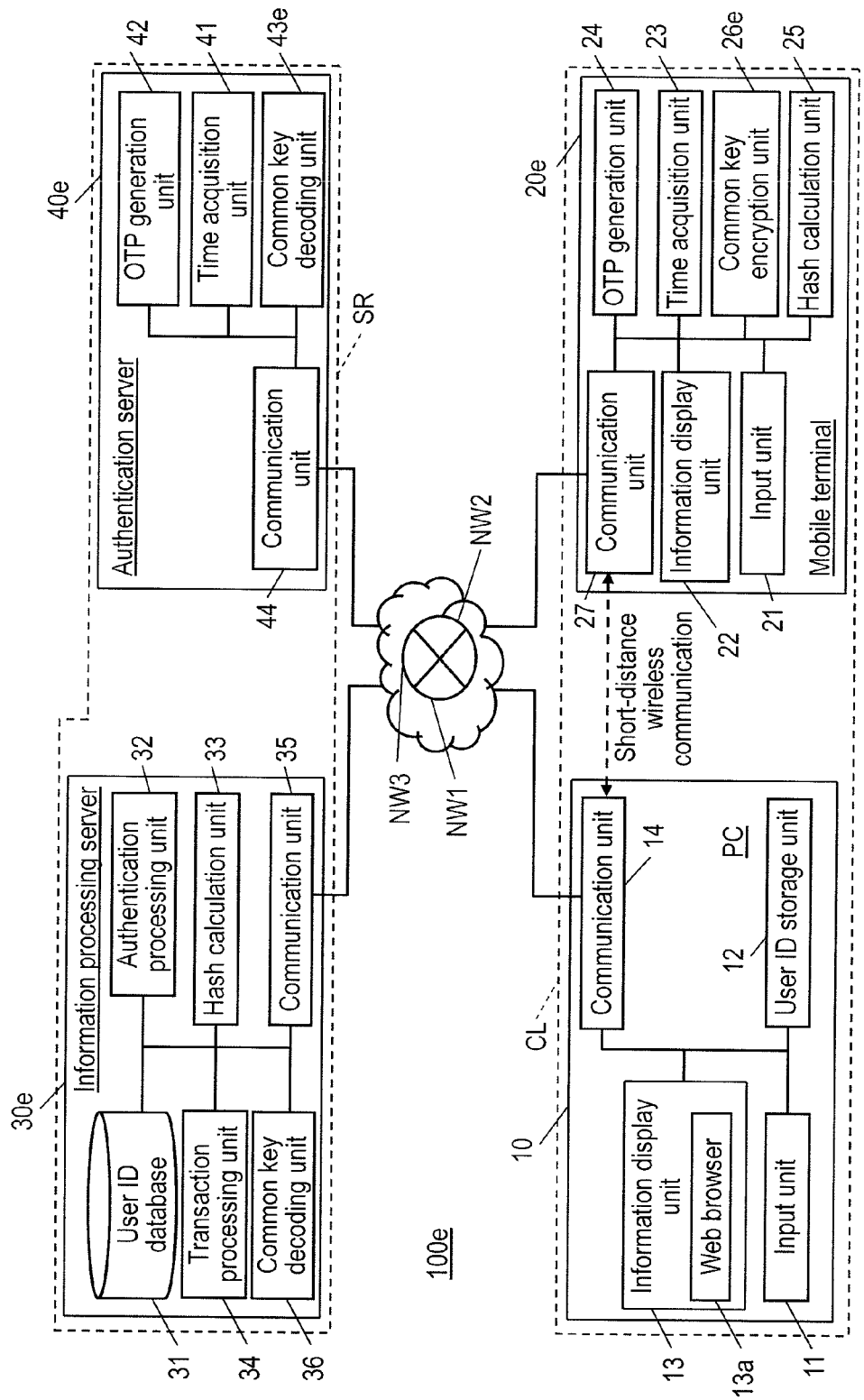
FIG. 9 is a block diagram illustrating the internal configuration of each of the units of an authentication system according to a third embodiment in detail.

FIG. 9 is a block diagram illustrating the internal configuration of each of the units of authentication system 100*e* according to a third embodiment in detail. Authentication system 100*e* shown in FIG. 9 includes PC 10, mobile terminal 20*e*, information processing server 30*e*, and authentication server 40*e*. PC 10 and mobile terminal 20*e*, which are examples of a user terminal, form client terminals CL in authentication system 100*e*. Information processing server 30*e* and authentication server 40*e* form servers SR in authentication system 100*e*. In description of each of the units of authentication system 100*e* shown in FIG. 9, the same reference numeral is are attached to the a unit having the same content as each of the units of authentication system 100 shown in FIG. 1, the description thereof is omitted or simplified, and different content will be described.

PC 10 shares a prescribed password P (for example, login password or the like) with information processing server 30*e* in advance.

Mobile terminal 20*e* includes input unit 21, information display unit 22, time acquisition unit 23, OTP generation unit 24, hash calculation unit 25, common key encryption unit 26*e*, and communication unit 27. Common key encryption unit 26*e* shares the same common key encryption algorithm with common key decoding unit 36 of information processing server 30*e* and common key decoding unit 43*e* of authentication server 40*e*, and encrypts input information. Meanwhile, if common key encryption unit 26*e* includes two common key algorithms, one of the common key algorithms is shared with common key decoding unit 36 of information processing server 30*e*, and the other common key algorithm is shared with common key decoding unit 36 of information processing server 30*e*, and thus security becomes further stronger.

Information processing server 30*e* includes user ID database 31, authentication processing unit 32, hash calculation unit 33, transaction processing unit 34, communication unit 35, and common key decoding unit 36. Common key decoding unit 36 shares the same common key encryption algorithm with common key encryption unit 26*e* of mobile terminal 20*e*, and decodes the input information.

Authentication server 40*e* includes time acquisition unit 41, OTP generation unit 42, common key decoding unit 43*e*, and communication unit 44. Common key decoding unit 43*e* shares the same common key encryption algorithm with common key encryption unit 26*e* of mobile terminal 20*e*, and decodes the input information.

(Operational Procedure of Signaling in Authentication System According to Third Embodiment)

Subsequently, the operational procedure of each of the units in authentication system 100*e* according to the embodiment will be chronologically described in detail with reference to FIG. 10. FIG. 10 is a sequence diagram illustrating an example of the operational procedure of signaling between PC 10, mobile terminal 20*e*, information processing server 30*e*, and authentication server 40*e* in authentication system 100*e* according to the third embodiment in detail. A premise of description in FIG. 10 is a state in which the check screen of the transaction information (refer to FIG. 2A) is displayed on the screen of Web browser 13*a* as a result of the transaction information being input in the Internet banking by the input operation performed by the user using input unit 11. Meanwhile, in the description of the sequence shown in FIG. 10, the same step number is attached to the same operation of the sequence shown in FIG. 3, and the description of the same content will be omitted or simplified.

In FIG. 10, after a process in step S1 is performed, PC 10 transmits a password P, transaction information, and a user ID, which are shared with information processing server 30*e* in advance, to mobile terminal 20 through short-distance wireless communication (S2*e*).

After a process in step S7 is performed, mobile terminal 20*e* generates fourth encryption information C, acquired by encrypting the encryption information B which is generated in step S7, while using the password P, which is transmitted from PC 10 in step S2*e*, as a common key (encryption key) (S41), and transmits fourth encryption information C and the user ID to information processing server 30*e* through network NW2 (S8*e*).

Information processing server 30*e* decodes the fourth encryption information C, which is transmitted from mobile terminal 20*e* in step S8*e*, while using the password P, which is shared with PC 10, as the common key (decode key) (S42). Since operations of information processing server 30*e* and authentication server 40*e* after step S9, which are performed after the process in step S42, are performed, are the same as in the sequence shown in FIG. 3, the description thereof will be omitted.

As above, in authentication system 100*e* according to the embodiment, mobile terminal 20*e* and authentication server 40*e* share the one-time password OTP, PC 10 and information processing server 30*e* shares the prescribed password P, and information processing server 30*e* compares the hash value A of the transaction information, which is calculated in information processing server 30*e*, with a hash value A' as fourth decode information, which is derived by decoding the fourth encryption information C and the encryption information B which are encrypted by mobile terminal 20e in such a way as to encrypt the hash value A of the transaction information using one-time password OTP and then encrypt the hash value A of the transaction information using the password P.

Therefore, compared to the advantage of authentication system 100 according to the first embodiment, authentication system 100e can have further strong security by using a double-common key encryption algorithm, in which the one-time password OTP and the prescribed password P are used, with regard to the man-in-the-middle attacks performed by the malicious third party on the communication path between mobile terminal 20d and information processing server 30d. Therefore, compared to authentication system 100 according to the first embodiment, authentication system 100e can further safely authenticate PC 10 in authentication server 40, and thus it is possible to further safely perform the process with regard to the transaction information in information processing server 30.

Meanwhile, although some operational procedures are described as above, it is possible to combine each of the operational procedures. For example, it is possible to transmit all of the information from PC 10 to the server SR and transmit the result of determination from authentication server 40 to PC 10 while combining FIGS. 4 and 5.

Hereinafter, the configuration of the authentication system according to the above described embodiments will be described.

In the-above described embodiment, there is provided an authentication system in which a client terminal that receives input of request information is connected to a server that executes a process with regard to the request information, the client terminal includes: a first authentication information generation unit that generates first authentication information based on information which is shared with the server; an encryption unit that generates encryption information which is acquired by encrypting the request information using a common key method while using the first authentication information as a key; and a transmission unit that transmits the request information and the encryption information to the server, and the server includes: a reception unit that receives the request information and the encryption information; a second authentication information generation unit that generates second authentication information based on the information which is shared with the client terminal; a decoding unit that generates reference information which is acquired by decoding the encryption information using the same common key method as in the client terminal while using the second authentication information as a key; and an authentication unit that compares the request information with the reference information.

In addition, in the authentication system, the server executes the process with regard to the request information when the request information is identical to the reference information as a result of comparison of the request information and the reference information performed by the authentication unit.

In addition, in the authentication system, bit lengths of the first authentication information and the second authentication information are the same as a bit length of the key in the common key method which is used by the encryption unit and the decoding unit.

In addition, in the authentication system, the client terminal or the server generates the first authentication information or the second authentication information based on identification information for identifying the client terminal and time information in the client terminal or the server.

In addition, in the authentication system, the client terminal generates the first authentication information based on current time information in the client terminal, and the server generates a plurality of pieces of second authentication information based on previous time information including current time information in the server and generates a plurality of pieces of reference information for each of the plurality of pieces of second authentication information, and compares the request information with the plurality of pieces of reference information.

In addition, in the authentication system, the client terminal includes: a user terminal that receives the input of the request information; and a mobile terminal that includes the first authentication information generation unit and the encryption unit, and the server includes: an information processing server that includes the authentication unit; and an authentication server that includes the second authentication information generation unit and the decoding unit.

In addition, in the authentication system, the mobile terminal and the information processing server further include a hash calculation unit that calculates a hash value of the request information.

In addition, in the authentication system, the information processing server executes the process with regard to the request information when it is determined that the request information is identical to the reference information by the authentication unit.

In addition, in the authentication system, the client terminal includes: a user terminal that receives the input of the request information; and a mobile terminal that includes the first authentication information generation unit and the encryption unit, the server includes: an information processing server that receives the request information; and an authentication server that includes the second authentication information generation unit, the decoding unit, and the authentication unit, and the authentication server transmits a result of comparison acquired by the authentication unit to the information processing server.

In addition, in the authentication system, the user terminal or the mobile terminal further includes the transmission unit.

In addition, in the authentication system, the mobile terminal further includes: a random number encryption unit that generates an encryption random number by encrypting a random number using a public key included in the authentication server; and a request information encryption unit that generates encryption request information by encrypting the encryption random number using the common key method while using the request information as the key, and the encryption unit generates the encryption information by encrypting the encryption request information.

In addition, in the authentication system, the information processing server further includes: a decoding unit that performs decoding using the second authentication information included in the user terminal, the mobile terminal encrypts the encryption information using the second authentication information, and transmits the encryption information to the information processing server, and the information processing server decodes information which is received from the mobile terminal using the second authentication information, and transmits the decoded information to the authentication server.

Hereinabove, although various embodiments have been described with reference to the accompanying drawings, it is apparent that the present invention is not limited to the examples. It is apparent that those skilled in the art can understand various alternation examples and modification examples in the scope of the Claims and can naturally understand that the alternation examples and modification examples belong to the technical scope of the present invention.

The present invention is useful as an authentication system which detects the falsification of request information due to man-in-the-middle attacks and which safely performs authentication on request information from a client terminal which accesses a server.

What is claimed is:

1. An authentication system,
the authentication system comprising:
   a client terminal that receives input of request information; and
   a server that communicates with the client terminal and executes a process with regard to the request information,
   wherein the client terminal includes:
   a transmitter:
   a client processor;
   a client memory including instructions that when executed by the client processor, cause the client processor to perform operations including:
   generating first authentication information and;
   generating encryption information which is acquired by encrypting the request information using a common key method while using the first authentication information as a key;
   wherein the transmitter transmits the request information and the encryption information to the server via a communication network, and
   wherein the server includes:
   a receiver that receives the request information and the encryption information via the communication network;
   a server processor;
   a server memory including instructions that when executed by the server processor, cause the server processor to perform operations including:
   generation second authentication information that is synchronized with the first authentication information and is kept from being transmitted via the communication network;
   generating reference information which is acquired by decoding the encryption information using the common key method as in the client terminal while using the second authentication information as a key; and
   comparing the request information with the reference information,
   wherein the client memory further includes instructions that when executed by the client processor, cause the client processor to perform operations including:
   generating the first authentication information based on current time information in the client terminal as time information within the client terminal, and
   wherein the server memory further includes instructions that when executed by the server processor, cause the server processor to perform operations that include
   generating a plurality of items of the second authentication information based on previous time information as the time information within the server including current time information in the server and generates a plurality of items of the reference information for each of the plurality of items of the second authentication information, and compares the request information with the plurality of items of the reference information.

2. An authentication system, the authentication system comprising:
   a user terminal that transmits transaction information, which includes at least a transaction amount, a payment destination, and a user ID, to a mobile terminal via a short-distance wireless communication and to a server via Internet;
   a mobile terminal that generates a first one-time password and encryption information;
   a server that communicates with the user terminal and executes a process with regard to the transaction information, wherein
   the mobile terminal includes:
   a mobile terminal transmitter;
   a mobile terminal processor;
   a mobile terminal memory including instructions that when executed by the mobile terminal processor, cause the mobile terminal processor to perform operations including:
   acquiring time information within the mobile terminal;
   generating the first one-time password by using the time information within the mobile terminal and the user ID transmitted from the user terminal;
   generating the encryption information which is acquired by encrypting the transaction information, which is transmitted from the user terminal, using a common key method while using the first one-time password as a key;
   the mobile terminal transmitter transmits the encryption information and the user ID to the server via a mobile communication network, without the first one-time password; and
   wherein the server includes:
   a receiver that receives the transaction information and the user ID transmitted from the user terminal, and the encryption information transmitted from the mobile terminal;
   a server processor;
   a server memory including instructions that when executed by the server processor, cause the server processor to perform operations including:
   acquiring time information within the server independently of the user terminal;
   generating a second one-time password by using the time information within the server and the user ID transmitted from the user terminal, wherein the second one-time password is synchronized with the first one-time password and is kept from being transmitted via the communication network;
   generating reference information which is acquired by decoding the encryption information using the common key method as in the mobile terminal while using the second one-time password as a key; and
   comparing the transaction information with the reference information,
   wherein the mobile terminal memory further includes instructions of generating the first one-time password at a pre-determined cycle, and
   wherein the server memory further includes instructions of generating the second one-time password at the pre-determined cycle.

3. The authentication system of claim 2,
   wherein the mobile terminal memory further includes instructions that when executed by the mobile terminal processor, cause the mobile terminal processor to perform operations including calculating a hash value of the transaction information and wherein the server memory further includes instructions that when executed by the server processor, cause the server processor to perform operations including calculating a hash value of the reference information.

4. The authentication system of claim 2,
wherein server memory further includes instructions that when executed by the server processor, cause the server processor to perform operations including:
executing the process with regard to the transaction information when it is determined that the transaction information is identical to the reference information.

5. The authentication system of claim 2,
wherein the mobile terminal memory further includes instructions that when executed by the mobile terminal processor, cause the mobile terminal processor to perform operations including:
generating an encryption random number by encrypting a random number using a public key included in the server; and
generating encryption request information by encrypting the encryption random number using the common key method while using the transaction information as the key, and
generating the encryption information by encrypting the encryption request information.

6. An authentication method which is executed by a user terminal that transmits transaction information, which includes at least transaction amount, payment destination, and a user ID, to a mobile terminal via a short-distance wireless communication and to a server via Internet, a mobile terminal that generates first one-time password and encryption information, and a server that communicates with the user terminal and the mobile terminal and executes a process with regard to the transaction information, the authentication method comprising:
causing the mobile terminal to perform operations including:
generating a first one-time password by using the time information within the mobile terminal and the user ID transmitted from the user terminal;
generating encryption information which is acquired by encrypting the transaction information, which is transmitted from the user terminal, using a common key method while using the first one-time password as a key;
transmitting the encryption information and the user ID to the server via a mobile communication network, without the first one-time password; and
causing the server to perform operations including:
acquiring time information within the server independently of the mobile terminal;
receiving the transaction information and the user ID transmitted from the user terminal, and the encryption information transmitted from the mobile terminal;
generating a second one-time password by using the time information within the server and the user ID transmitted from the user terminal, wherein the second one-time password is synchronized with the first one-time password and is kept from being transmitted;
generating reference information which is acquired by decoding the encryption information using the common key method as in the client terminal while using the second one-time password as a key; and
comparing the transaction information with the reference information,
wherein the operations performed by the mobile terminal further include generating the first one-time password at a pre-determined cycle, and
wherein the operations performed by the server further include generating the second one-time password at the pre-determined cycle.

7. The authentication system of claim 2, wherein the mobile communication network is a network having a higher level of security than a level of security of the Internet.

* * * * *